United States Patent
Katz et al.

(10) Patent No.: US 7,561,527 B1
(45) Date of Patent: Jul. 14, 2009

(54) BIDIRECTIONAL FORWARDING DETECTION

(76) Inventors: David Katz, 1231 Delaware Ave., Santa Cruz, CA (US) 95060; David D. Ward, 301 221st Ave., Somerset, WI (US) 54025

(*) Notice: Subject to any disclaimer, the term of this patent is extended or adjusted under 35 U.S.C. 154(b) by 800 days.

(21) Appl. No.: 10/838,151

(22) Filed: May 3, 2004

Related U.S. Application Data

(60) Provisional application No. 60/467,276, filed on May 2, 2003.

(51) Int. Cl.
*H04L 1/00* (2006.01)
*H04L 12/26* (2006.01)

(52) U.S. Cl. .................. 370/241; 370/242; 370/244; 370/249; 370/250

(58) Field of Classification Search ................ 370/248, 370/249, 241, 242, 224, 216
See application file for complete search history.

(56) References Cited

U.S. PATENT DOCUMENTS

| | | | | |
|---|---|---|---|---|
| 4,002,847 A * | 1/1977 | Dail | ........................... | 370/224 |
| 6,940,808 B1 * | 9/2005 | Shields et al. | ............... | 370/216 |
| 6,996,626 B1 * | 2/2006 | Smith | ........................ | 709/232 |
| 6,996,631 B1 * | 2/2006 | Aiken et al. | ................ | 709/242 |
| 7,088,698 B1 * | 8/2006 | Harsch | ....................... | 370/338 |
| 2002/0093954 A1 * | 7/2002 | Weil et al. | ................... | 370/389 |
| 2003/0007622 A1 * | 1/2003 | Kalmanek et al. | ........... | 379/219 |
| 2003/0112748 A1 * | 6/2003 | Puppa et al. | ................ | 370/217 |
| 2003/0179742 A1 * | 9/2003 | Ogier et al. | ................ | 370/351 |
| 2003/0198184 A1 * | 10/2003 | Huang et al. | ................ | 370/231 |
| 2003/0212801 A1 * | 11/2003 | Yang-Huffman | ............ | 709/228 |
| 2004/0047290 A1 * | 3/2004 | Komandur et al. | .......... | 370/230 |
| 2004/0052212 A1 * | 3/2004 | Baillargeon | ................ | 370/235 |
| 2004/0114922 A1 * | 6/2004 | Hardee | ........................ | 398/17 |
| 2004/0133368 A1 * | 7/2004 | Johansson et al. | ............. | 702/58 |
| 2008/0037436 A1 * | 2/2008 | Liu | ........................... | 370/250 |

OTHER PUBLICATIONS

H. Sandick, M. Squire, B. Cain, I. Duncan, B Haberman "Fast LIveness Protocol (FLIP)," Internet Draft: draft-sandiick-flip-00.txt, (Internet Engineering Task Force, Feb. 2000) downloaded from http://www.watersprings.org/pub/id/draft-sandiick-flip-oo.txt, on Jul. 8, 2004, 19 pgs.

Hal Sandick, Brian Haberman, "Fast LIveness Protocol: FLIP," *Proceedings of the Forty-Seventh Internet Engineering Task Force*, Slides 1-7 (Mar. 26-32, 2000) downloaded from http://www.ietf.org/proceedings/00mar/slides/ipo-flip-00mar/sld001.html.

* cited by examiner

*Primary Examiner*—Chi H Pham
*Assistant Examiner*—Farah Faroul
(74) *Attorney, Agent, or Firm*—Straub & Pokotylo; John C. Pokotylo

(57) ABSTRACT

A protocol for detecting faults in a bidirectional path between two forwarding engines, where parts of the bidirectional path checked may include interfaces, one or more data links, and to the extent possible the forwarding engines themselves, with potentially very low latency. The protocol may operate independently of media, data protocols, and routing protocols.

54 Claims, 13 Drawing Sheets

BIDIRECTIONAL FORWARDING DETECTION

§ 0. BENEFIT OF EARLIER FILED PROVISIONAL APPLICATION

This application claims the benefit of U.S. Provisional Application No. 60/467,276, entitled "BIDIRECTIONAL FORWARDING DETECTION," filed on May 2, 2003, and listing Dave Katz and Dave Ward as inventors. That Provisional Application is incorporated herein by reference. The invention is not limited to the particular embodiments described in that Provisional Application.

§ 1. BACKGROUND OF THE INVENTION

§ 1.1 Field of the Invention

The invention concerns detecting failures in communications systems. In particular, the invention concerns detecting failures, such as forwarding engine failures, interface failures, and/or link failures, of a data forwarding path between and including two data forwarding devices, such as routers for example.

§1.2 Related Art

The description of art in this section is not an admission that such art is prior art to the invention.

An increasingly important feature of networking equipment is the rapid detection of communication failures between adjacent systems, in order to more quickly establish, or switch over to, alternative paths once an error occurs. Currently, failures can be detected fairly quickly in certain circumstances if data link hardware (such as SONET alarms for example) supports such detection.

However, there are media that do not provide this kind of signaling (such as Ethernet), and some media may not detect certain kinds of failures in the path, for example, failing interfaces or forwarding engine components. Moreover, failure detection is often much slower in many communications network devices, especially if there is no hardware signaling to facilitate such detection. For example, routing protocols sometimes include some form of liveness detection. For example, the intermediate system-intermediate system protocol (IS-IS) and the open shortest path first protocol (OSPF) include a "hello" mechanism that lets a router running IS-IS or OSPF know whether nodes sharing a communications link with the router (e.g., its neighbors or peers) are still up. Some protocols, such as a border gateway protocol (BGP) for example, use the underlying transport to determine the liveness of their neighbors. In the case of BGP, TCP keepalives are used. Other protocols, such as routing information protocols (RIP) for example, have intrinsic liveness mechanisms. In most cases, once an adjacency (e.g., with a neighbor node running the same protocol) is established with an initial hello message, subsequent hello messages don't need to carry much information.

In most, if not all, of these existing protocol-based liveness detection mechanisms, the time needed to conclude that one's neighbor is down ranges from seconds, to tens, or even hundreds of seconds. For example, with IS-IS, hellos are normally sent every nine (9) seconds. A node determines a neighbor to be down only after three (3) consecutive hellos have been unanswered. Accordingly, a node running IS-IS normally needs at least 27 seconds before it can determine that a neighbor node is down. Similarly, with the point-to-point protocol (PPP), hellos are normally sent every ten (10) seconds. A node determines a neighbor to be down only after three (3) consecutive hellos have been unanswered. Accordingly, a node running PPP normally needs at least 30 seconds before it can determine whether a neighbor node is down.

Historically, since routers and other nodes on the Internet have been predominantly used for communicating data, mainly on a best effort basis, for applications (such as e-mail for example) that are tolerant of some delays or packets received out of sequence, the aforementioned delays in detecting liveness were acceptable. However, as alluded to above, as it becomes desirable to have more demanding applications (such as voice over IP for example) use the Internet or some other packet-switched network, there are many instances where it is required to detect that a neighbor is down in a few tenths of a second, or even hundredths of a second. Such fast liveness detection is needed where failover needs to occur quickly so that an end user doesn't perceive, or at least isn't unduly annoyed by, the failure of an adjacency (e.g., due any one or a node failure, a link failure, or a protocol failure). As another example of a need for fast liveness detection and failover, a one second time for such detection may represent a great deal of lost data at gigabit rates.

Furthermore, routing protocol Hellos are of no help when those routing protocols are not in use. Moreover, the semantics of failure detection using routing protocols versus failure detection using data link hardware are subtly different—routing protocol failure detection techniques detect a failure in the path between the two routing protocol engines.

In view of the foregoing, there is a need to quickly detect failures in a data forwarding path, such as interface failures, link failures and/or forwarding engine failures, between and including two forwarding engines.

§ 2. SUMMARY OF THE INVENTION

The invention may be used to provide a low-overhead, short-duration detection of failures (such as interface failures, data link failures, and to the extent possible, failures of the forwarding engines themselves) in the data forwarding path between and including adjacent forwarding engines. Embodiments consistent with the invention may do so by providing a simple, fixed-field, hello protocol, referred to as bidirectional forwarding detection (BFD). Systems associated with a given BFD session may transmit BFD packets periodically over one or more data forwarding paths between the two systems. If a system stops receiving BFD packets for a sufficient time, some component in that particular bidirectional path to the neighboring system is assumed to have failed.

In at least one embodiment consistent with the invention, a data forwarding path is only declared to be operational when two-way communication has been established between systems (though this does not necessarily mean that a bidirectional link must be used.)

In at least one embodiment consistent with the invention, a separate BFD session may be created for each data forwarding path and data protocol in use between two systems.

In at least one embodiment consistent with the invention, each system participating in a BFD session estimates how quickly it can send and receive BFD packets. These estimates are used to determine mutually agreeable parameters concerning how fast BFD packets are to be transmitted and/or how fast a detection of failure will occur. These estimates can be modified in real time, for example to adapt to unusual situations. Thus, such an embodiment consistent with the invention allows for fast systems on a shared medium with a slow system to more rapidly detect failures between the fast systems, while allowing the slow system to participate to the best of its ability.

In at least one embodiment consistent with the invention, BFD can operate in two different modes—an asynchronous mode and an echo mode. In the asynchronous mode, each system may send a series of BFD control packets to one another, and if a number of those packets in a row are not received by the other system, the BFD session is declared to be down and a error in the data forwarding path is assumed. In the echo mode, BFD control packets are sent at a relatively slow rate (such as one per second). In addition, streams of BFD echo packets are transmitted in each direction such that the other system will loop them back through its forwarding path (e.g., by setting the destination address of the packets to that of the transmitting system). If a number of packets in a row of either the stream of control packets or the stream of echo packets are not received, the BFD session is determined to be down and a failure in the data forwarding path is assumed.

§ 3. BRIEF DESCRIPTION OF THE DRAWINGS

FIGS. 6A-6E, collectively referred to as FIG. 6, is a flow diagram of an exemplary method that may be used to handle the receipt of a BFD control packet in a manner consistent with principles of the invention.

Figure 7:
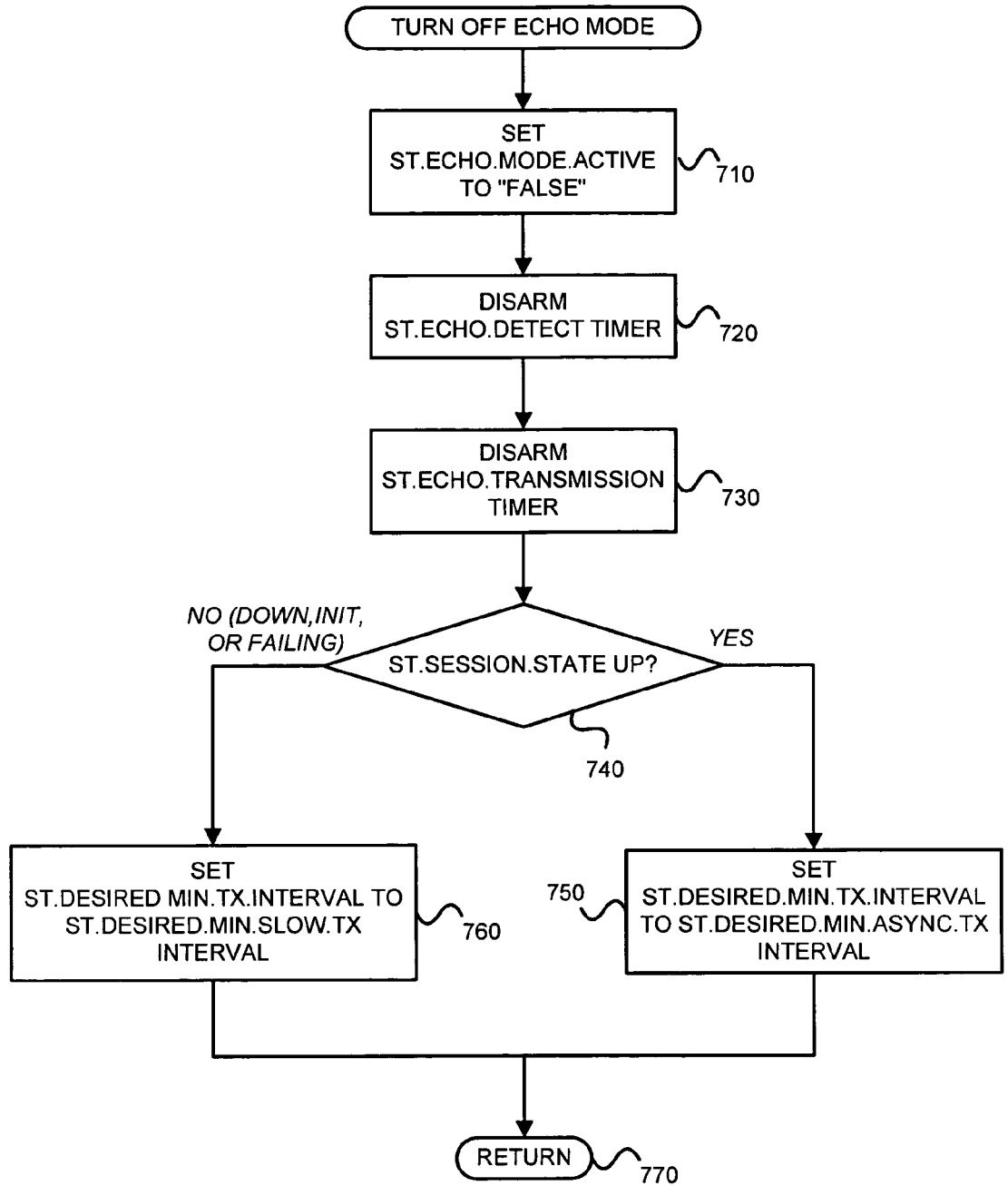

FIG. 7 is flow diagram of an exemplary method that may be used to turn off the echo mode in a manner consistent with principles of the invention.

Figure 8:
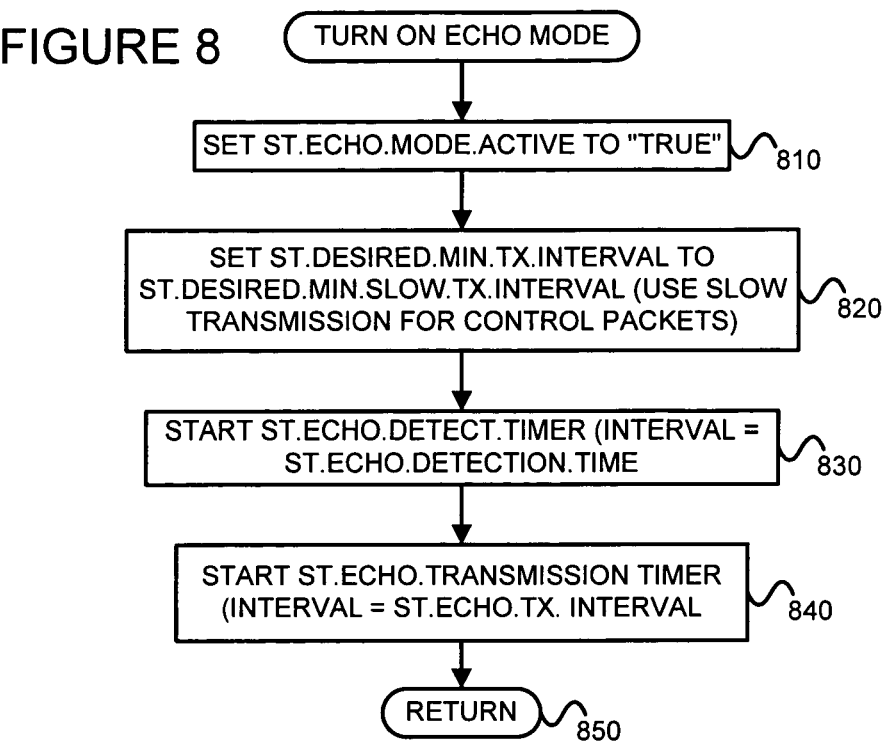

FIG. 8 is a flow diagram of an exemplary method that may be used to turn on the echo mode in a manner consistent with principles of the invention.

Figure 9:
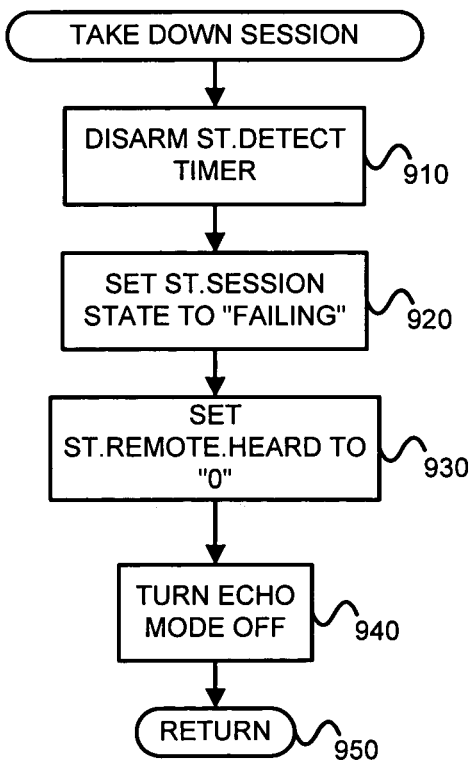

FIG. 9 is a flow diagram of an exemplary method that may be used to take down a BFD session in a manner consistent with principles of the invention.

Figure 10:
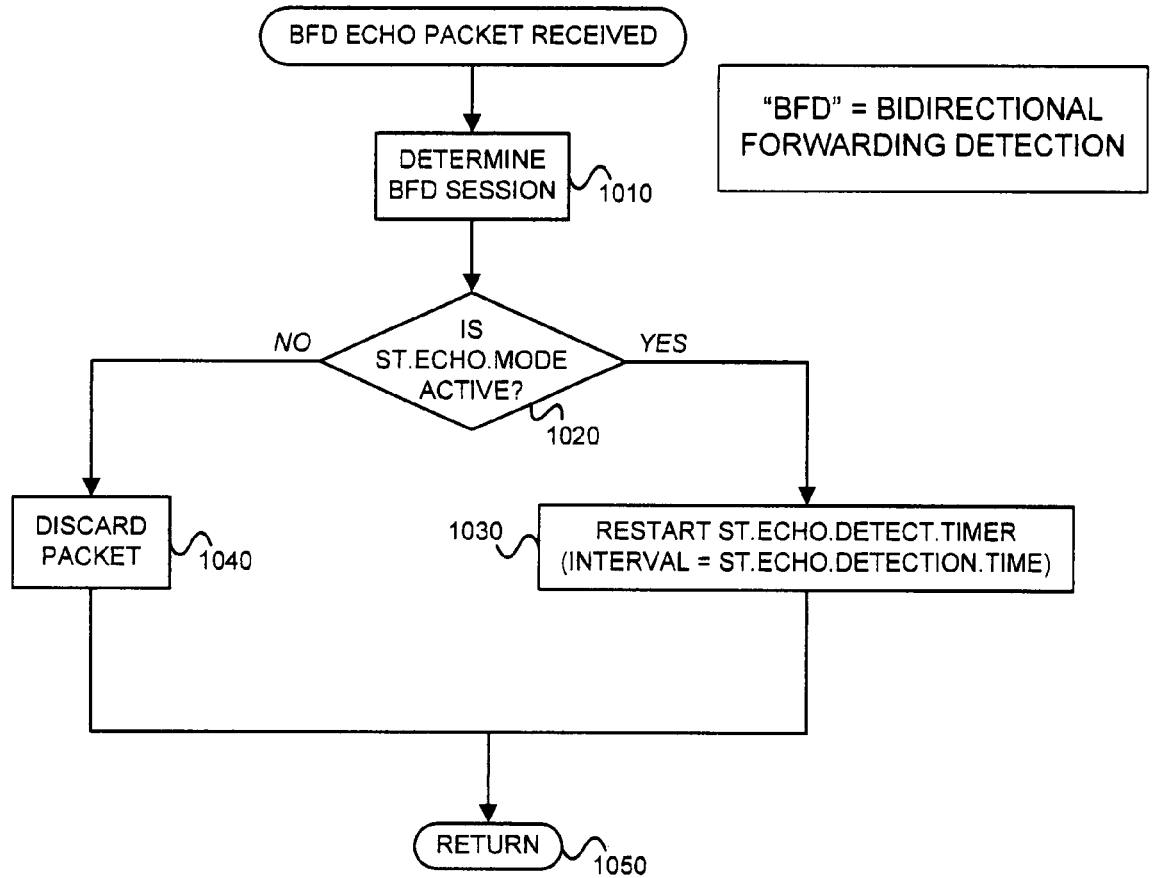

FIG. 10 is a flow diagram of an exemplary method that may be used to handle the receipt a BFD echo packet in a manner consistent with principles of the invention.

Figure 11:
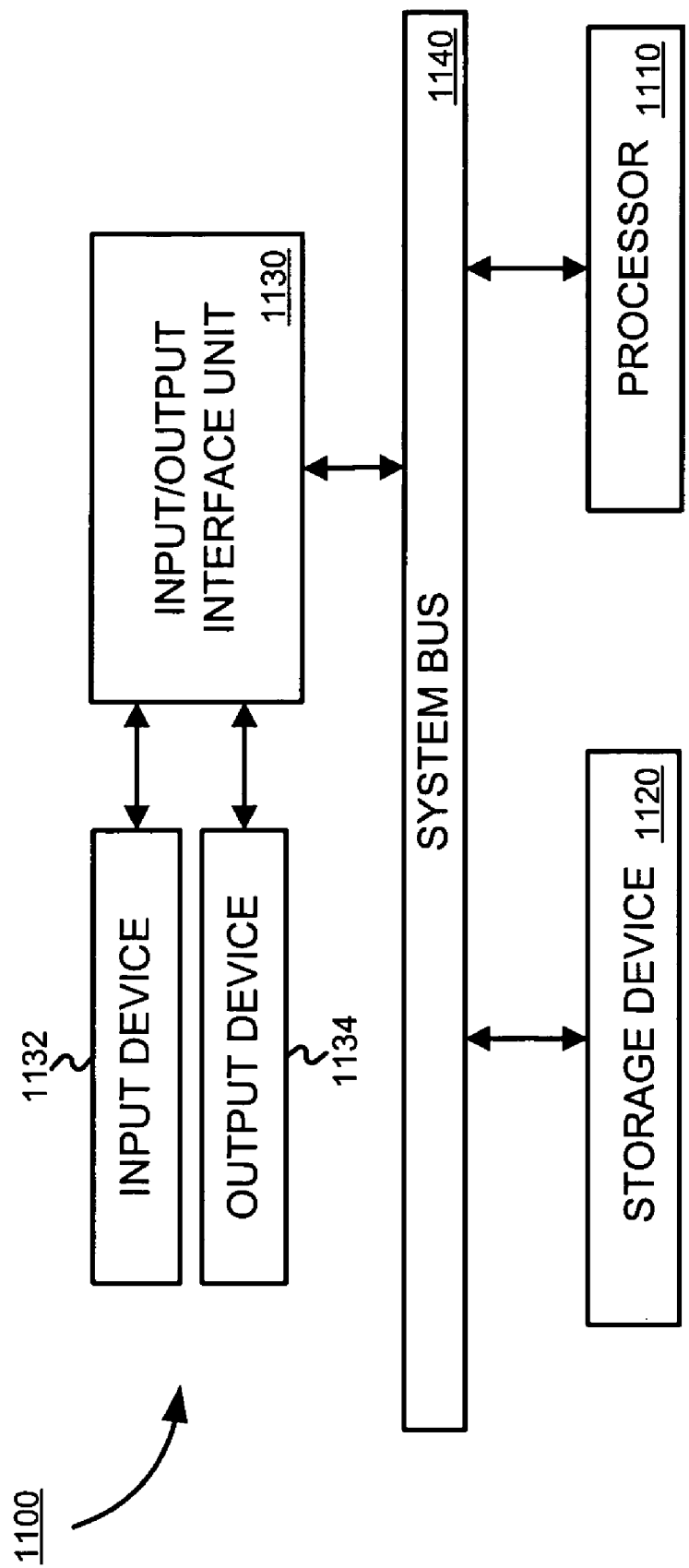

FIG. 11 is high-level block diagram of a machine that may be used to perform various operations and store various information in a manner consistent with the invention.

§ 4. DETAILED DESCRIPTION

Figure 1:
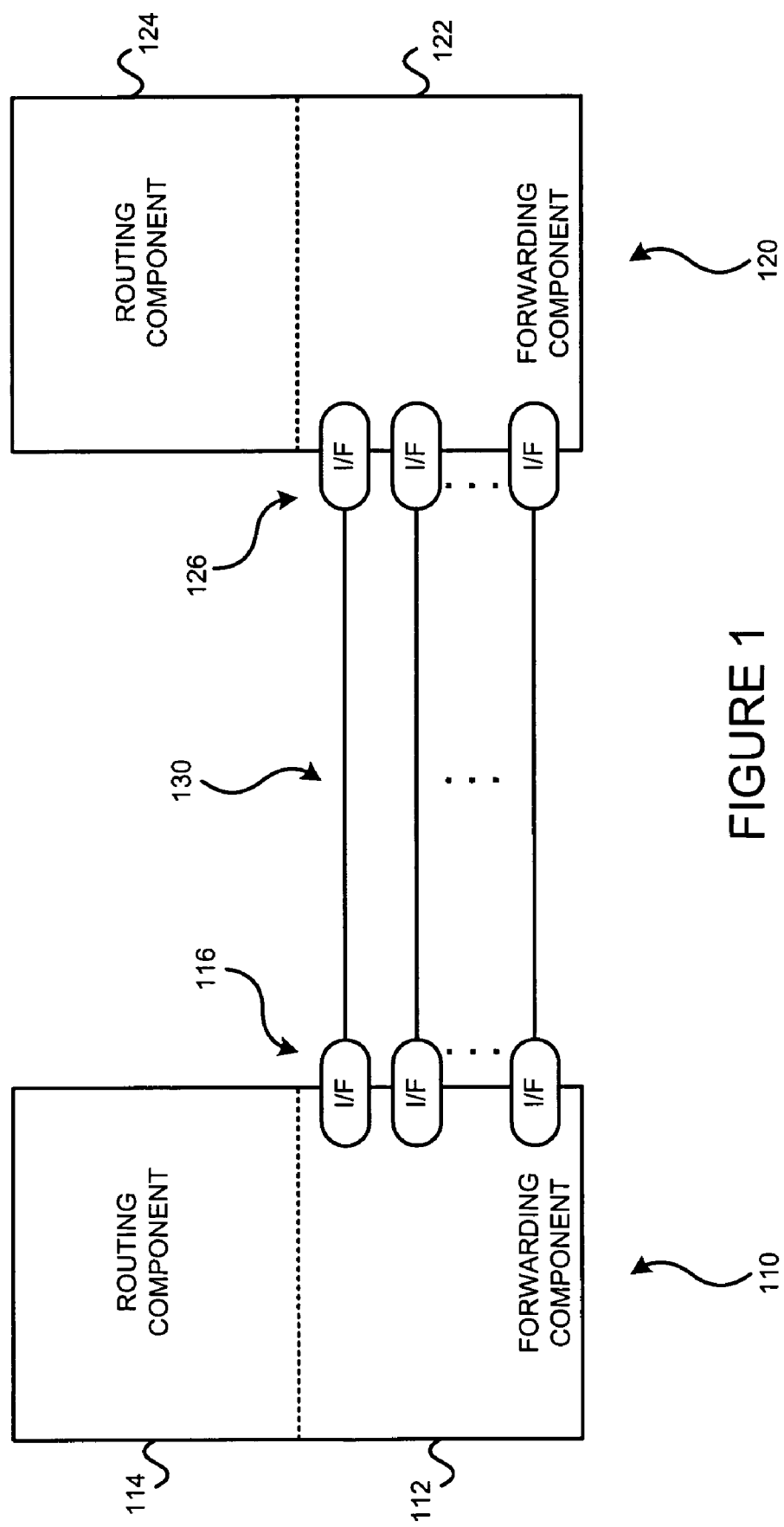
FIG. 1 is a diagram of an exemplary environment in which the invention may be used.

An exemplary environment, in which embodiments consistent with the invention may operate, is introduced with reference to FIG. 1 in § 4.1. Then exemplary operations of embodiments consistent with the invention, as well as exemplary methods, data structures and apparatus, are introduced with reference to FIGS. 2-11 in § 4.2.

§ 4.1 Exemplary Environment

FIG. 1 illustrates two systems 110 and 120 coupled via communications links 130. The links may be physical links or "wireless" links. The systems 110,120 may be routers for example. If the systems 110,120 are routers, each may include a routing component 114,124 and a forwarding component 112,122. Each system 110,120 includes one or more interfaces 116,126 that terminate one or more communications links 130. A failure in the so-called "data forwarding plane" may occur in one of the forwarding components 112, 122, one of the interfaces 116,126, and/or one of the links 130.

The invention can detect such failures in communication with a data forwarding plane next hop. The invention may be implemented in some component of the forwarding component 112,122 of a system 110,120 in systems having separate forwarding and control (e.g., routing) components. Such an implementation binds the invention more to the data plane and also decouples its operation from the fate of the routing components 114,124. This makes the invention useful in concert with various "graceful restart" mechanisms used for routing protocols.

The invention may operate on top of (i.e., use) any data protocol being forwarded at any layer between two systems. The invention may operate in a unicast, point-to-point manner.

The invention can detect failures on any kind of path between systems, including, for example, direct physical links, virtual circuits, tunnels, multiprotocol label-switching label-switched paths ("MPLS LSPs"), multihop routed paths, and unidirectional links (provided that there is some return path)

The invention can be used to establish multiple BFD sessions between the same pair of systems when multiple paths between the systems are present in at least one direction, even if the same path is used in the other direction.

The invention may be used to keep both systems aware of state changes (for example, both when establishing a BFD session and when tearing it down). It may do so by implementing a three-way handshake.

§ 4.2 Exemplary Embodiment

Figure 2:
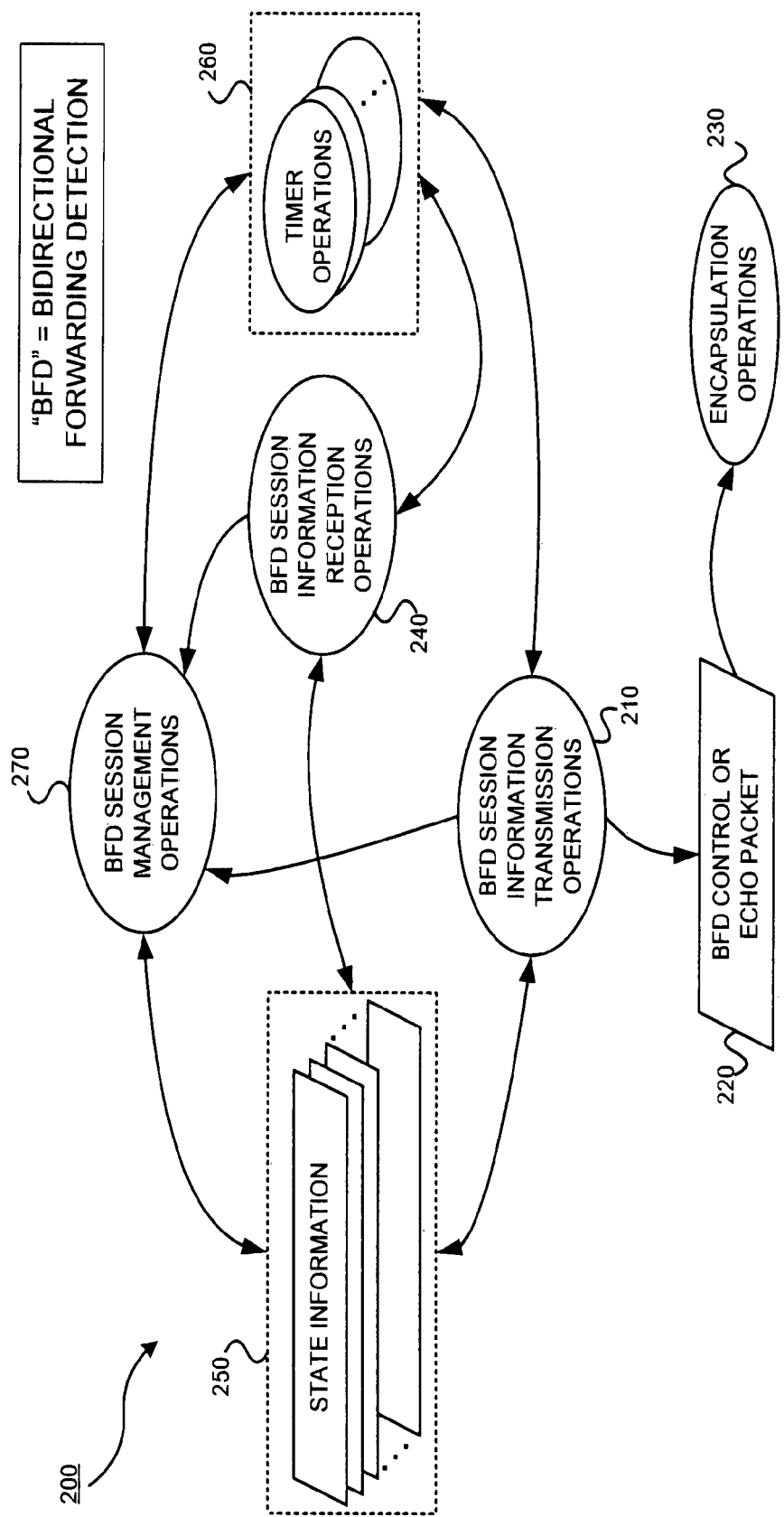
FIG. 2 is a diagram illustrating operations that may be performed, and information that may be generated, used, and/or stored, in accordance with principles of the invention.

FIG. 2 is a diagram illustrating operations that may be performed, and information that may be generated, used, and/or stored, in accordance with principles of the invention. Collectively, these operations and information may be referred to as a "BFD component" 200. Each system 110,120 should have at least one instance of a BFD component 200.

Session information transmission operations 210 may be used to generate one or more streams of control and/or echo packets 220. These packets 220 may be encapsulated (e.g., provided as a data payload in other packets) by encapsulation operations 230. The other packets (not shown) may then be transmitted over the data forwarding plane. The session information transmission operations may use, and operate in accordance with, state information 250 and information from timer operations 260.

Session information reception operations 240 may use state information 250, timer information 260 and received control and/or echo packets (not shown), to change state information 250 and/or to change timer operations 260 (either directly, or via session management operations 270).

Session management operations 270 may be used to set and/or change state information 250 and/or to manipulate timer operations 260.

Although not shown, the timer operations 260 may operate in accordance with at least some state information 250.

Embodiments consistent with the invention may be used to provide a simple, fixed-field, hello protocol. Systems associated with a given BFD session use session information transmission operations 210 to generate BFD control and/or echo packets for periodic transmission over one or more data forwarding paths between the two systems. Using the session information reception operations 240, timer operations 260 and state information 250, a system can determine if it has not received BFD packets for a predetermined time. If so, some component in the particular bidirectional path to the neighboring system, associated with the BFD session, is assumed to have failed. Conversely, a data forwarding path may be considered to be operational when two-way communication has been established between systems (though this does not necessarily mean that a bidirectional link must be used.)

A separate BFD session (e.g., implemented by a separate instance of BFD component 200) may be created or provided for each data forwarding path and data protocol in use between two systems. Each system participating in a BFD session may estimate how quickly it can send and receive BFD packets. These estimates are used to determine mutually agreeable parameters concerning how fast BFD packets are to be transmitted and/or how fast a detection of failure will occur. These estimates can be modified in real time, for example to adapt to unusual situations. Thus, the invention allows for fast systems on a shared medium with a slow system to more rapidly detect failures between the fast systems while allowing the slow system to participate to the best of its ability.

In one embodiment of the invention, BFD can operate in two different modes—an asynchronous mode and an echo mode. In the asynchronous mode, each system may send a series of BFD control packets to one another, and if a number of those packets in a row are not received by the other system, the BFD session may be declared to be down and a error in the data forwarding path may be assumed. In the echo mode, BFD control packets are sent at a relatively slow rate (such as one per second). In addition, streams of BFD echo packets are transmitted in each direction such that the other system will loop them back through its forwarding path (e.g., by setting the destination address of the packets to that of the transmitting system). If a number of packets in a row of either the stream of control packets or the stream of echo packets are not received, the BFD session may be determined to be down and a failure in the data forwarding path may be assumed.

The asynchronous mode is advantageous in that it may require half as many packets to achieve a particular detection time, as does the echo mode. It is also used when the echo mode cannot be supported for some reason. On the other hand, the echo mode has the advantage of truly testing only the data forwarding path on the remote system since the echo packets are forwarded in the same way as data packets, which may reduce round-trip jitter and thus allow more aggressive detection times, as well as potentially detecting some classes of failure that might not otherwise be detected (e.g., failures in parts of the forwarding path not used in the transmission and receipt of control packets).

The echo mode should only be enabled when both systems signal that they are willing to do so.

Figure 3:
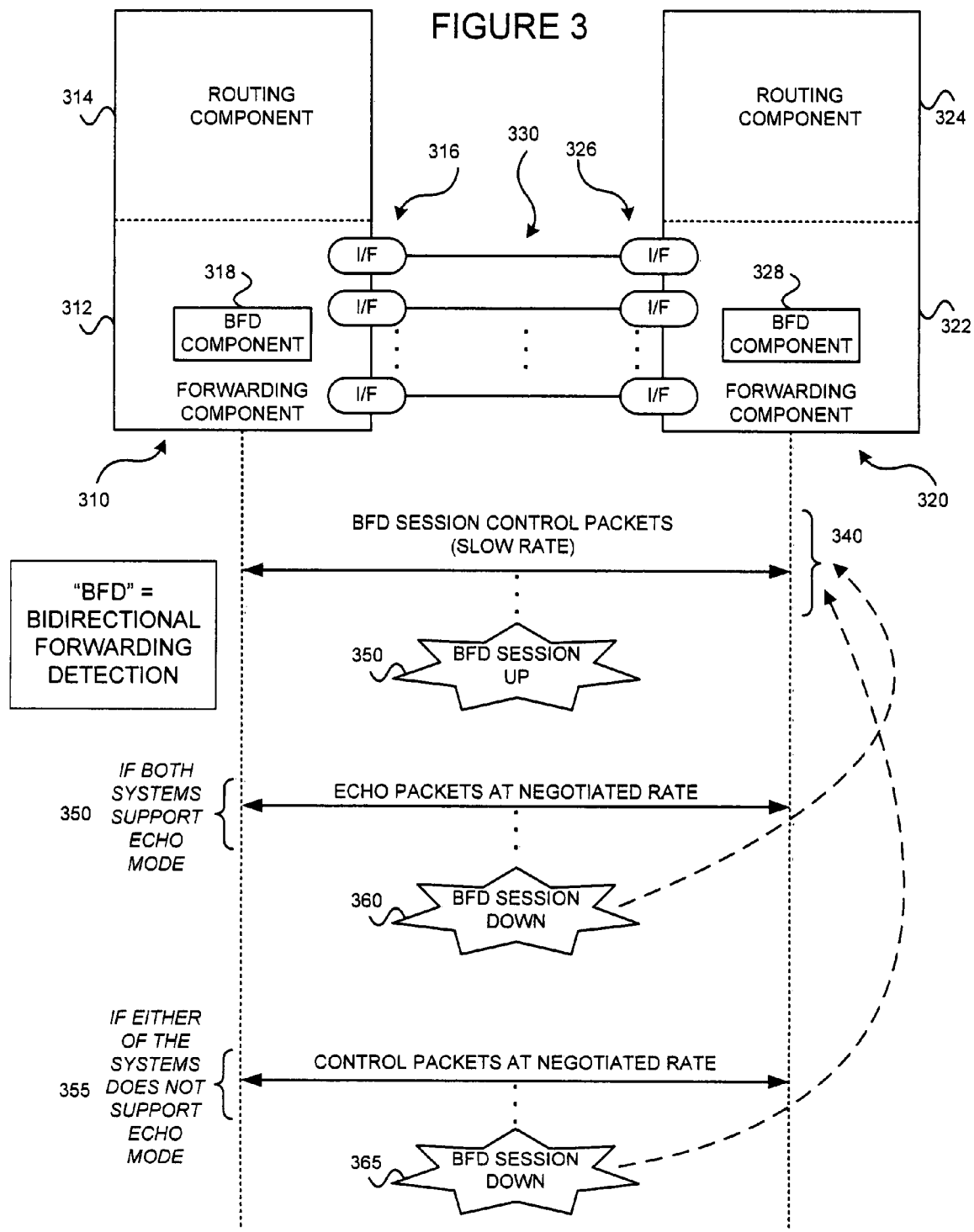
FIG. 3 illustrates an overview of an exemplary BFD session between two data forwarding systems.

FIG. 3 illustrates an overview of an exemplary BFD session between systems 310,320 coupled via communications links 300, each system 310,320 having a routing component 314,324, a forwarding component 312,322, and interfaces 316,326. A BFD component 318,328 is preferably included in a forwarding component 312,322. As shown, the exemplary BFD session begins with a periodic, slow (e.g., one packet per second) transmission of BFD control packets 340. When bidirectional communication is achieved (e.g., as indicated by a successful three way handshake), the BFD session comes up as indicated by 350.

Recall that BFD can support an asynchronous mode and an echo mode. If both systems 310,320 signal that they can support the echo mode, they continue to send BFD control packets at the slow rate and start transmitting BFD echo packets at the negotiated rate 350. A given system should not send BFD echo packets more rapidly than the other system is willing to accept them (according to advertised state information, such as Required.Min.Echo.Rx.Interval described in § 4.2.2.1 below.)

As indicated by 360 and the dashed line back to 340, if the BFD session fails, the transmission of BFD echo packets (if any) ceases, and the transmission of control packets goes back to the slower rate.

If at least one system does not wish to, or cannot, support the echo mode, the systems 310,320 instead may send BFD control packets at a higher, negotiated rate 355. As indicated by 365 and the dashed line back to 340, if the BFD session fails, the transmission of BFD control packets goes back to the slower rate.

§ 4.2.1 Exemplary Timer Methods

Figure 4:
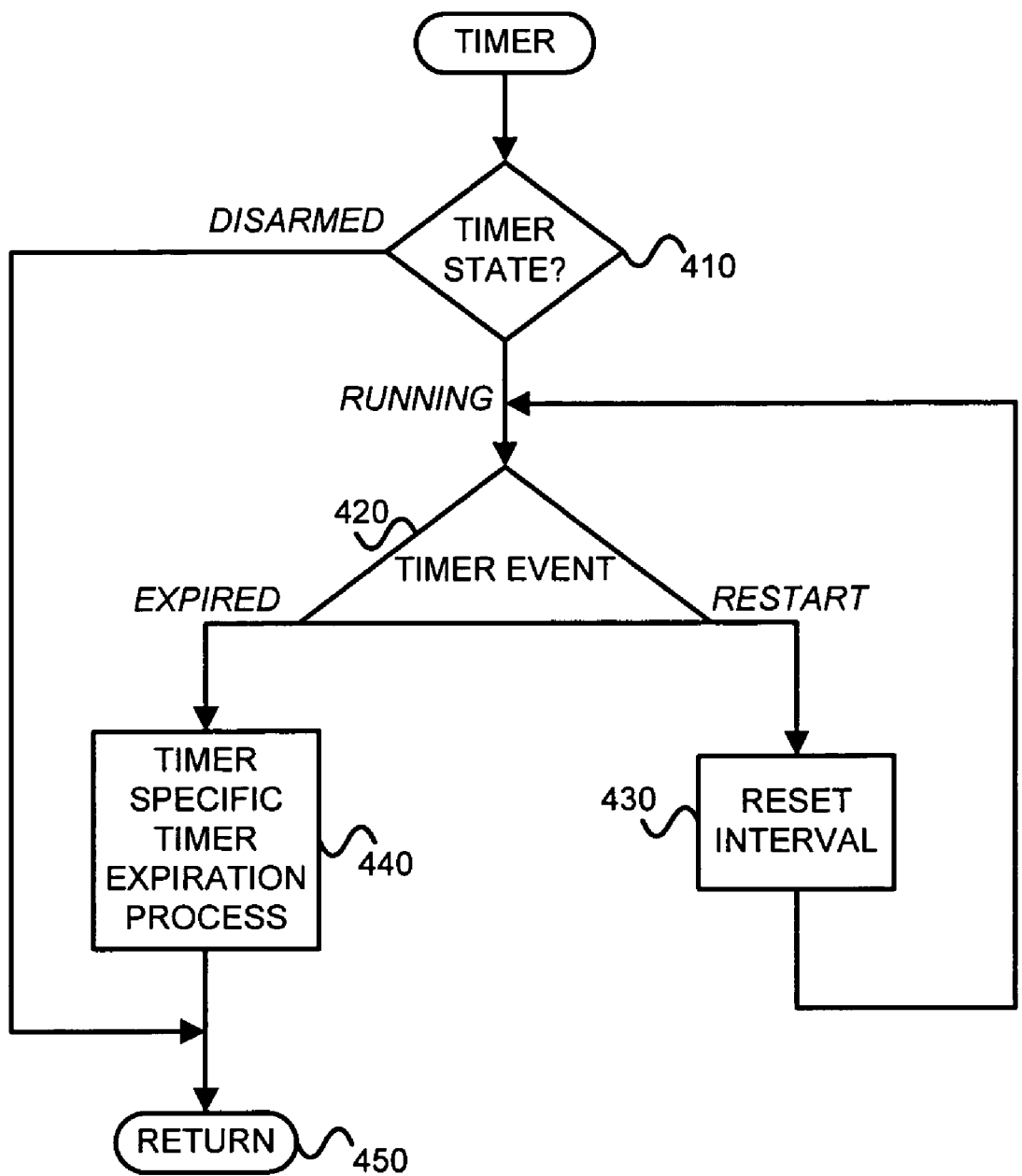
FIG. 4 is a flow diagram of an exemplary method that may be used to perform a timer operation in a manner consistent with principles of the invention.

Recall from FIG. 2 that the exemplary BFD session component 200 includes timer operations 260. FIG. 4 is an exemplary method 400 for performing a timer operation 260 in a manner consistent with principles of the invention. A timer is an entity that will measure an interval of time and perform some action, such as providing a notification for example, when that time interval expires. A timer has two states—running and disarmed. A disarmed timer will not expire. (See decision block 410 and node 450.) If it is not reset, a running timer will expire after the specified interval. The expiration of a running timer can invoke a timer specific timer expiration process. (See decision block 410, timer event block 420, and block 440.) The timer specific timer expiration process may simply be issuing a notification of the timer's expiration, or may include more complex processing. A running timer can be restarted before it expires, in which case it will then not expire until the new interval has passed without another reset. (See timer event block 420 and block 430.)

Some timers may be jittered. In one embodiment, jittering is a process where a random value is subtracted from the interval (expressed as a percentage of the interval) when the timer is started. Jitter may be used to avoid the self-synchronization of nominally independent timers.

§ 4.2.2 Exemplary Data Structures

Recall from FIG. 2 that the exemplary BFD session component 200 includes (or uses) state information 250. Recall also that the exemplary BFD session component 200 may process and generate BFD echo and/or control packets 270. Exemplary state information 250 that may be used and/or generated in a manner consistent with principles of the invention are described in § 4.2.2.1. An exemplary BFD control packet data structure is described in § 4.2.2.2 below.

§ 4.2.2.1 Exemplary State Information

Embodiments consistent with the invention may maintain a set of state information elements for each session with neighboring systems. This set of state information elements, corresponding to the creation of a new session, may be created in a number of ways known to those skilled in the art. The following description is not intended to limit the invention—other state information elements that support the functionality described can be used. More or less state information elements may be used in various embodiments consistent with the invention. In the following, the prefix "st." indicates that the information is state information.

The state information element st.SourceAddress is the source address information used when transmitting BFD control packets for a session, appropriate to the environment. The value of st.SourceAddress may be set in a number of ways, which will be apparent to those skilled in the art.

The state information element st.DestinationAddress is the destination address information used when transmitting BFD control packets for a session, appropriate to the environment. The value of st.DestinationAddress may be set in a number of ways, which will be apparent to those skilled in the art.

The state information element st.EchoSourceAddress is the source address information used when transmitting BFD echo packets for a session, appropriate to the environment, if echo mode is supported. This address is an address associated with the transmitting system, and may be part of a subnet other than the one over which the packet is being sent (in order to avoid the transmission of ICMP Redirects). The value of st.EchoSourceAddress may be set in a number of ways, which will be apparent to those skilled in the art.

The state information element st.EchoDestinationAddress is the destination address information used when transmitting BFD echo packets for a session, appropriate to the environment. This address is an address associated with the transmitting system. It should be an address for which the remote system will route packets back on the interface over which they are received, and should be part of the subnet over which the packet is being sent (if the link is subnetted.) The value of st.EchoDestinationAddress may be set in a number of ways, which will be apparent to those skilled in the art.

The state information element st.LocalDiscr is the local discriminator for a BFD session, used to uniquely identify it. It is unique on a system, and is nonzero. The value of st.LocalDiscr may be set in a number of ways, which will be apparent to those skilled in the art.

The state information element st.RemoteDiscr is the remote discriminator for a BFD session. This is the discriminator chosen by the remote system, and is totally opaque to (or at least is not needed by) the local system. This may be initialized to zero.

The state information element st.RemoteHeard is used to indicate whether or not a local system is actively receiving BFD packets from a remote system. The value of st.RemoteHeard is set to a first state (e.g., "1") if the local system is actively receiving BFD packets from the remote system, and is set to a second state (e.g., "0") if the local system has not received BFD packets recently (within the detection time), or if the local system is attempting to tear down the BFD session. The value of st.RemoteHeard may be initialized to zero.

The state information element st.SessionState is the perceived state of the BFD session (Initializing, Up, Failing, or Down.) The exact action or actions taken responsive to the session state changes may be application specific (although it is expected that this state change (particularly to and from Up state) is reported to other components of the system). The value of st.SessionState may be initialized to "DOWN".

The state information element st.EchoModeDesired is a boolean that indicates whether or not a system wishes to use echo mode.

The state information element st.EchoModeActive is a boolean tracking whether or not echo mode is active. The value of st.EchoModeActive may be initialized to FALSE.

The state information element st.LocalSessionDiagnostic is a diagnostic code specifying a reason the local session state most recently transitioned from the Up state to some other state. The value of st.LocalSessionDiagnostic may be initialized to zero.

The state information element st.RemoteSessionDiagnostic is a diagnostic code specifying a reason the remote session state most recently transitioned from Up stage to some other state. The value of st.RemoteSessionDiagnostic may be initialized to zero.

The state information element st.DesiredMinAsyncTXInterval is the minimum interval (e.g., in microseconds) between transmitted BFD control packets that a system would like to use while operating in asynchronous mode when the BFD session is "UP". The interval actually used is negotiated between the two systems. (Recall 355 of FIG. 3.) The value of st.DesiredMinAsyncTXInterval is nonzero, but may otherwise be set to a value which will be apparent to one skilled in the art in view of the application in which the BFD session is used.

The state information element st.DesiredMinSlowTXInterval is the minimum interval (e.g., in microseconds) between transmitted BFD control packets that a system would like to use while operating in echo mode, or when BFD session is not "UP". The interval actually used is negotiated between the two systems. (Recall, e.g., 340 of FIG. 3.) The value of st.DesiredMinSlowTXInterval is nonzero, but may otherwise be set to a value which will be apparent to one skilled in the art in view of the application in which the BFD session is used (though it is suggested that this value should be at least one second (1,000,000 μsec)).

The state information element st.DesiredMinEchoTXInterval is the minimum interval (e.g., in microseconds) between transmitted BFD echo packets that a system would like to use while operating in Echo mode. The interval actually use is negotiated between the two systems. (Recall, e.g., 350 of FIG. 3.) If Echo mode is supported, the value of st.DesiredMinEchoTXInterval is nonzero, but may otherwise be set to a value which will be apparent to one skilled in the art in view of the application in which the BFD session is used.

The state information element st.DesiredMinTXInterval is the minimum interval (e.g., in microseconds) between transmitted BFD control packets that a system would like to use at the current time. The interval actually used is negotiated between the two systems. The value of st.DesiredMinTXInterval is set to either st.DesiredMinSlowTXInterval, or st.DesiredMinAsyncTXInterval, depending on the session state and/or mode, but may be initialized to st.DesiredMinSlowTXIntervaL Alternatively, the value of st.DesiredMinTXInterval may be nonzero, but may otherwise be set to a value which will be apparent to one skilled in the art in view of the application in which the BFD session is used, although it may be advisable to initialize this value to at least one second (1M milliseconds).

The state information element st.RequiredMinRXInterval is the minimum interval (e.g., in microseconds) between received BFD control packets that a system requires. The value of st.RequiredMinRXInterval may be set to a value which will be apparent to one skilled in the art in view of the application in which the BFD session is used.

The state information element st.RequiredMinEchoRXInterval is the minimum interval (e.g., in microseconds) between received BFD echo packets that a system requires. If the system supports echo mode, the value of st.RequiredMinEchoRXInterval is nonzero. If the system does not support echo mode the value of st.RequiredMinEchoRXInterval may be set to zero. Otherwise, the value of st.RequiredMinEchoRXInterval may be set to a value which will be apparent to one skilled in the art in view of the application in which the BFD session is used.

The state information element st.TxInterval is the BFD control packet transmission interval (e.g., in microseconds)

agreed to by the systems for a BFD session. The value of st.TxInterval may be initialized to st.DesiredMinTXInterval. Note that an independent transmit interval may be used in each direction for a single BFD session.

The state information element st.EchoTxInterval is the BFD echo packet transmission interval (e.g., in microseconds) agreed to by the systems for a session. The value of st.EchoTxInterval may be initialized to zero. Note that an independent transmit interval may be used in each direction for a single BFD session.

The state information element st.DetectMult is the desired detect time multiplier for BFD control packets. The negotiated control packet transmission interval, multiplied by this value, will be the detection time for a session (as seen by the remote system.) The value of st.DetectMult may be a nonzero integer. Otherwise, the value of st.DetectMult may be set to a value which will be apparent to one skilled in the art in view of the application in which the BFD session is used.

The state information element st.EchoDetectMult may be the desired detect time multiplier for BFD echo packets. The negotiated echo packet transmission interval, multiplied by this value, will be the detection time for this session (as seen by the local system.) The value of st.EchoDetectMult may be a nonzero integer. Otherwise, the value of st.EchoDetectMult may be set to a value which will be apparent to one skilled in the art in view of the application in which the BFD session is used.

The state information element st.DetectionTime is the detection time of the failure of this BFD session by virtue of missing BFD control packets, as seen by the local system (e.g., in microseconds). The value of st.DetectionTime may be initialized to zero. Note that each system determines its own detection time, and the values of st.DetectionTime for each system might not be the same.

The state information element st.DetectTimer is a timer used to track session liveness by tracking the arrival of BFD control packets. The value of st.DetectTimer may be initialized to the disarmed state. If it expires, the session is deemed to have failed.

The state information element st.EchoDetectionTime is the detection time of the failure of a BFD session by virtue of missing BFD echo packets, as seen by the local system (e.g., in microseconds). The value of st.EchoDetectionTime may be initialized to zero. Note that each system determines its own detection time, and the values for each system might not be the same.

The state information element st.EchoDetectTimer is a timer used to track session liveness by tracking the arrival of BFD echo packets. This timer may be initialized to the disarmed state. If it expires, the session is deemed to have failed.

The state information element st.TransmissionTimer is a timer that triggers the transmission of a BFD control packet. It is initialized to the running state, with an interval of st.DesiredMinSlowTxInterval. In one embodiment, a jitter (e.g., of about 25%) is applied to this timer.

The state information element st.EchoTransmissionTimer is a timer that triggers the transmission of a BFD echo packet. It is initialized to the disarmed state. In one embodiment, jitter (e.g., of about 25%) is applied to this timer.

§ 4.2.2.2 Exemplary BFD Control Packet Format

In one embodiment of the invention, BFD control and/or echo packets are carried as the payload of whatever encapsulating protocol is appropriate for the medium and network. Note that many of the exact encapsulation mechanisms will often be implementation dependent and will not affect interoperability. BFD control packets are sent in an encapsulation appropriate to the environment. Specific examples of encapsulation techniques for particular environments are described in § 4.2.3.8 below.

Figure 5:
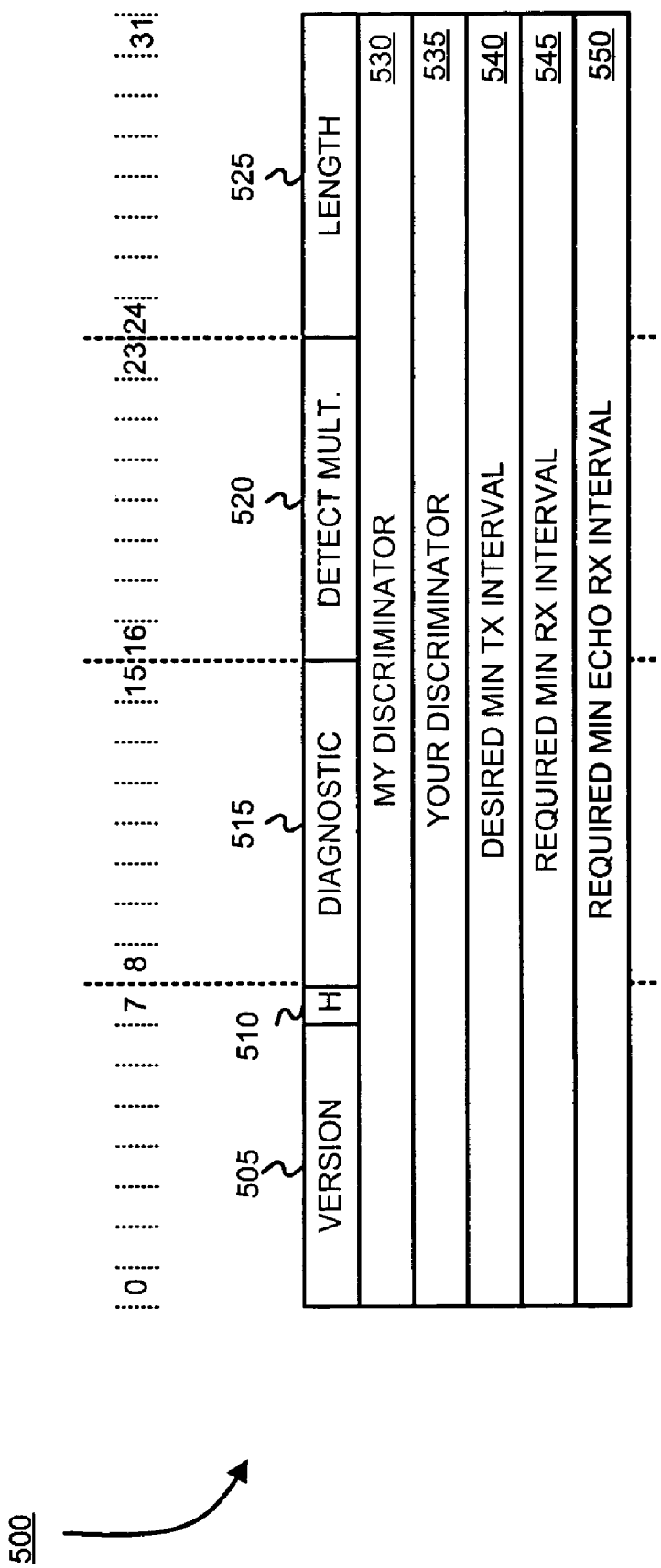
FIG. 5 illustrates an exemplary payload data structure of an exemplary BFD control packet.

FIG. 5 illustrates the payload of an exemplary BFD control packet 500. The "Version" field 505 includes the version number of the BFD protocol. The "H" (I Hear You) bit 510 is set to a first state (e.g., "0") if the transmitting system either is not receiving BFD packets from the remote system, or is in the process of tearing down the BFD session for some reason. Otherwise, this bit 510 is set to a second state (e.g., "1"). The "Diagnostic" field 515 includes a diagnostic code specifying the local system's reason for the last transition of the session from "UP" to some other state. In one exemplary embodiment, the following codes are used for diagnosis:

0—No diagnostic;
1—Control Detection time expired;
2—Echo Detection time expired;
3—Neighbor signaled session down; and
4—Forwarding plane reset.

The "Detect Mult" (Detect time multiplier) field 520, when multiplied by the negotiated transmission interval, provides the detection time for the transmitting system. The value of the "Length" field 525 defines the length (e.g., in bytes) of the BFD control packet 500. The "My Discr" field 530 carries a unique, nonzero session discriminator value generated by the transmitting system. It is used to demultiplex multiple BFD sessions between a given pair of systems. The "Your Discr" field 535 carries a discriminator received from the corresponding remote system. This field 535 may reflect back the received value of the "My Discr" field 530, or may be zero if that value is unknown. The value in the "Desired Min TX Interval" field 540 is the minimum interval (e.g., in microseconds) that the local system would like to use when transmitting BFD control packets. The value in the "Required Min RX Interval" field 545 is the minimum interval (e.g., in microseconds) between received BFD control packets that the system can support. Finally, the value in the "Required Min Echo RX Interval" field 550 is the minimum interval (e.g., in microseconds) between received BFD echo packets that the system can support. In one embodiment, if this value is zero, the transmitting system does not support BFD echo packets.

§ 4.2.2.3 Exemplary BFD Echo Packet Format

BFD echo packets are sent in an encapsulation appropriate to the environment. The specifics of particular environments are described in § 4.2.3.8 below.

The payload of a BFD echo packet may be based on the local applications using BFD. This is because the payload of a BFD echo packet is a local matter—the sending system uses the content, while the remote system does not even need to look at the content. A BFD echo packet should include information sufficient to demultiplex the received packet to the correct BFD session.

§ 4.2.3 Exemplary Methods

§ 4.2.3.1 Exemplary Methods for Processing Received BFD Control Packets

Recall from FIG. 2 that the exemplary BFD session component 200 includes a BFD session information reception operations 240. FIGS. 6A-6E, collectively referred to as FIG. 6, is a flow diagram of an exemplary method for handling the receipt of a BFD control packet in a manner consistent with principles of the invention.

As indicated, packet sanity may be checked (Block 602) and if the packet sanity check is not passed, the received BFD control packet is discarded (Block 606) before the method is left (Node 690). An exemplary packet sanity check may include one or more of the following three tests. If the version number is not correct, the packet sanity check fails. If the length field is less than the correct value (e.g., 24 bytes), the packet sanity check fails. Finally, if the length field is greater than the payload of the encapsulating protocol, the packet sanity check fails.

Assuming that the received packet passed a packet sanity test (Block 602), the method then selects an appropriate BFD state block based on some combination of source addressing information, the two discriminator fields, and by the interface over which the packet was received. Various techniques for looking up a session (e.g., a state block) may be used. The BFD session and its state are determined. (Block 604) If a matching session is not found, the packet may be discarded (Decision block 606 and Block 608). Alternatively, a new state may be created (not shown). The state-packet session agreement check may include one or both of the following two tests. If the value of st.RemoteDiscr is nonzero, it must match the value of the My Discr field 530 of the received packet. If it does not, the packet is discarded (Block 608 before the method is left (Node 690). If the value of the Your Discr field 535 is nonzero, it must match the value of st.LocalDiscr. If it does not, the packet is discarded (Block 608) before the method is left (Node 690). Note that if the value of st.RemoteDiscr is zero, it should be set to the value of the My Discr field 530.

Other packet sanity and/or session sanity checks may be used instead of, or in addition to those described above. Although not recommended, the invention can be practiced without packet sanity and/or session sanity checks.

Assuming that some local state session information and the session information in the received packet match, the method continues. In this method, the BFD echo mode is the default mode if the local st.EchoModeActive is TRUE. However, both systems must be willing to support the BFD echo mode if that mode is to be used. Therefore, it is determined whether or not the other (remote) system will support BFD echo mode sessions. (Decision block 610) If the other system will not support BFD echo mode (e.g., if the received Required Min Echo RX Interval is zero), the echo mode is disabled (e.g., TurnOffEchoMode method described below with reference to FIG. 7 is executed) (Block 612) before the method continues.

Various transmission intervals are determined and set. (Block 614) For example, the value for st.TxInterval may be set to the greater of the value of st.DesiredMinTxinterval and the value of the Required Min Rx Interval field 545 in the received BFD control packet. The value for st.EchoTxInterval may be set to the greater of the value of st.DesiredMinEchoTXInterval and the value of the Required Min Echo Rx Interval field 550 in the received BFD control packet.

Further, various detection intervals are determined and set. (Block 616) For example, the value of st.EchoDetectionTime may be set to the value of st.EchoTxInterval multiplied by the value of st.EchoDetectMult. The value of st.DetectionTime may be set to the greater of st.RequiredMinRXInterval and the value of the Desired Min TX Interval field 540 in the received BFD control packet, multiplied by the value of the Detect Multiplier field 520 in the received BFD control packet. Those skilled in the art will appreciate that the detection intervals may be determined using other information, or may simply be predefined. Thus the invention is not limited to determining detection times in the manner described.

The detection timer is started (or restarted). (Block 617) For example, the timing operation maintaining the state st.DetectTimer may be configured with an interval of st.DetectionTime.

The remote session diagnostic state may be set based on a state indicated by the other system. (Block 618) For example, the value of st.RemoteSessionDiagnostic may be set to the value of the diagnostic field 515 in the received BFD control packet.

Figure 6A:
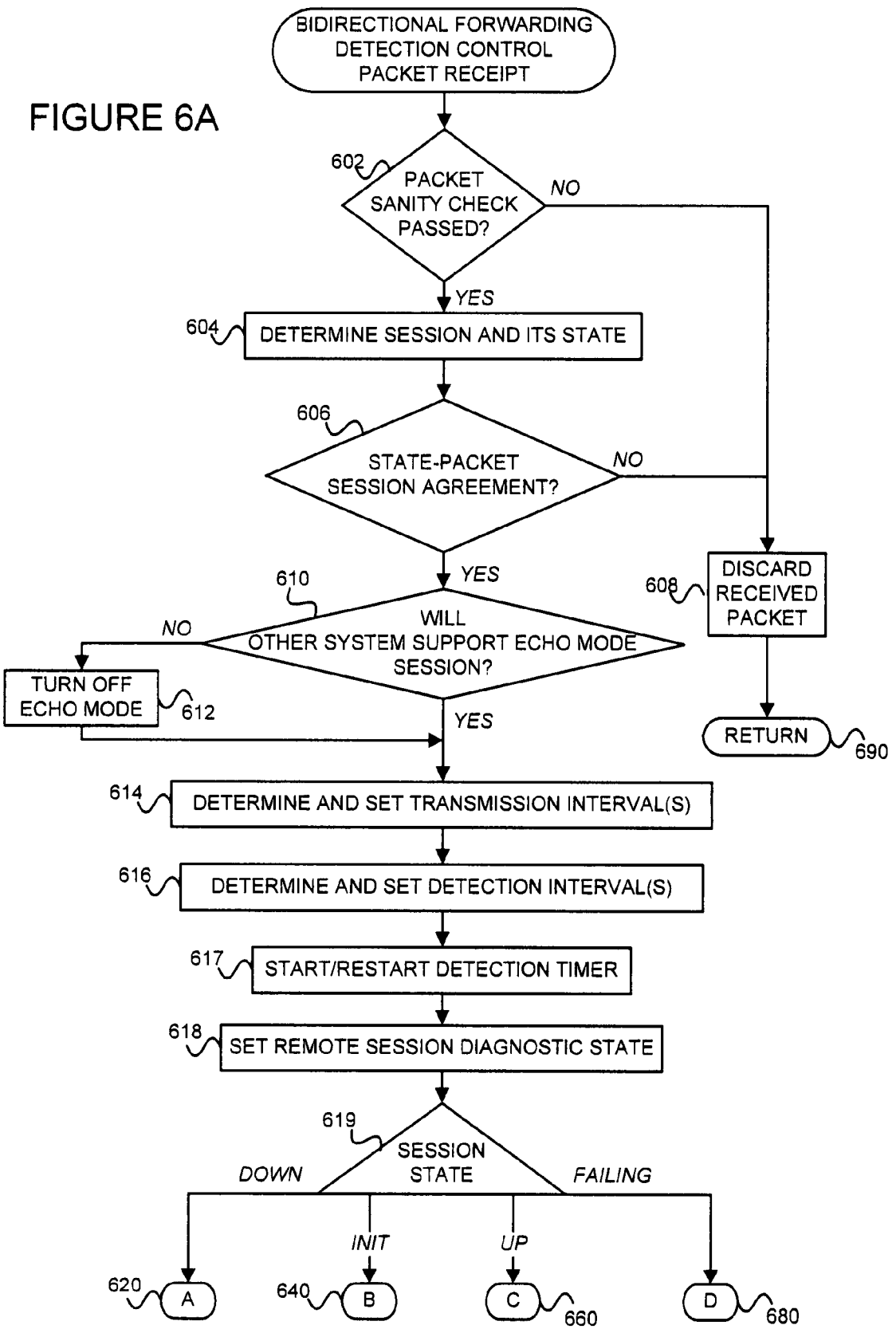
Figure 6B:
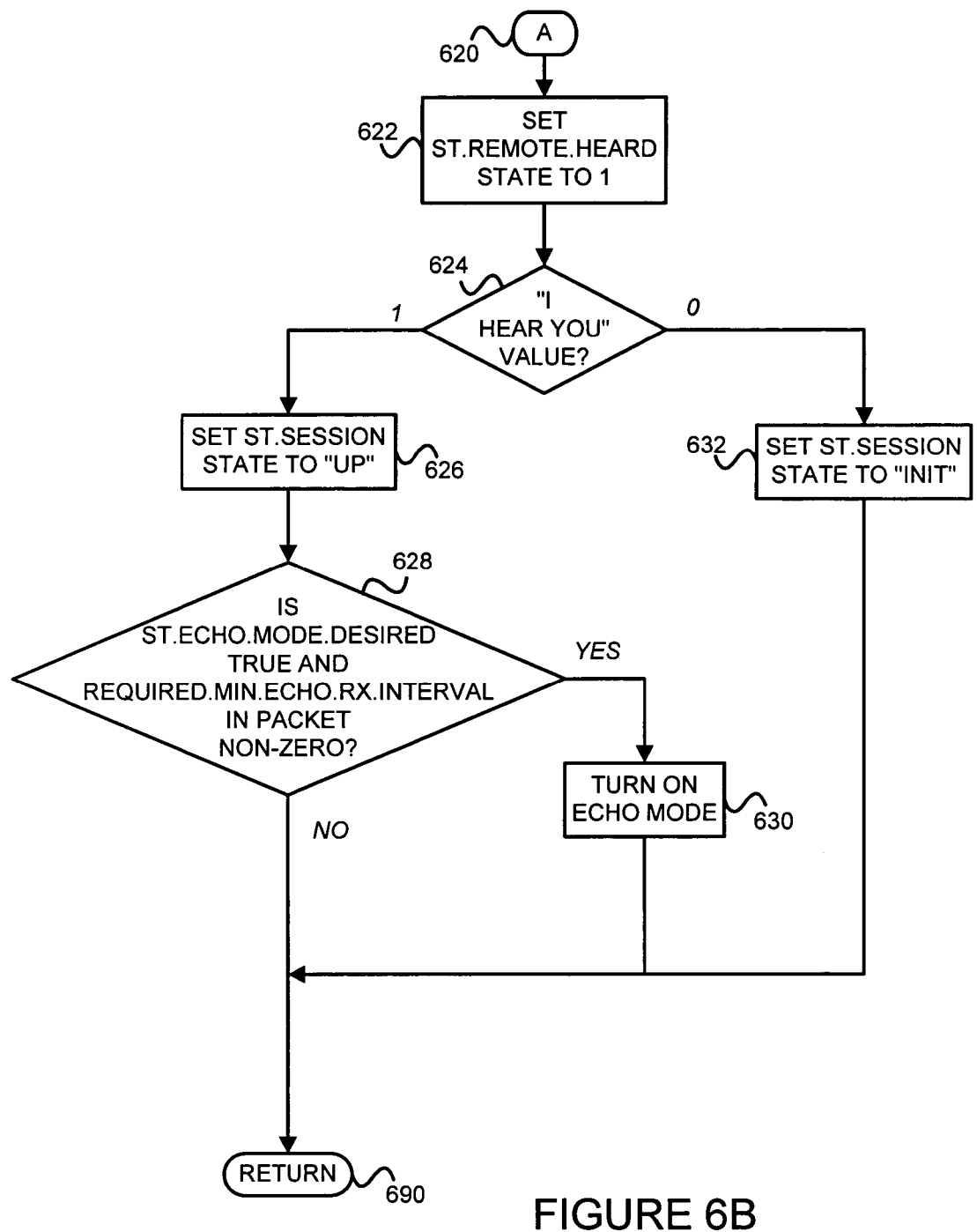
Figure 6C:
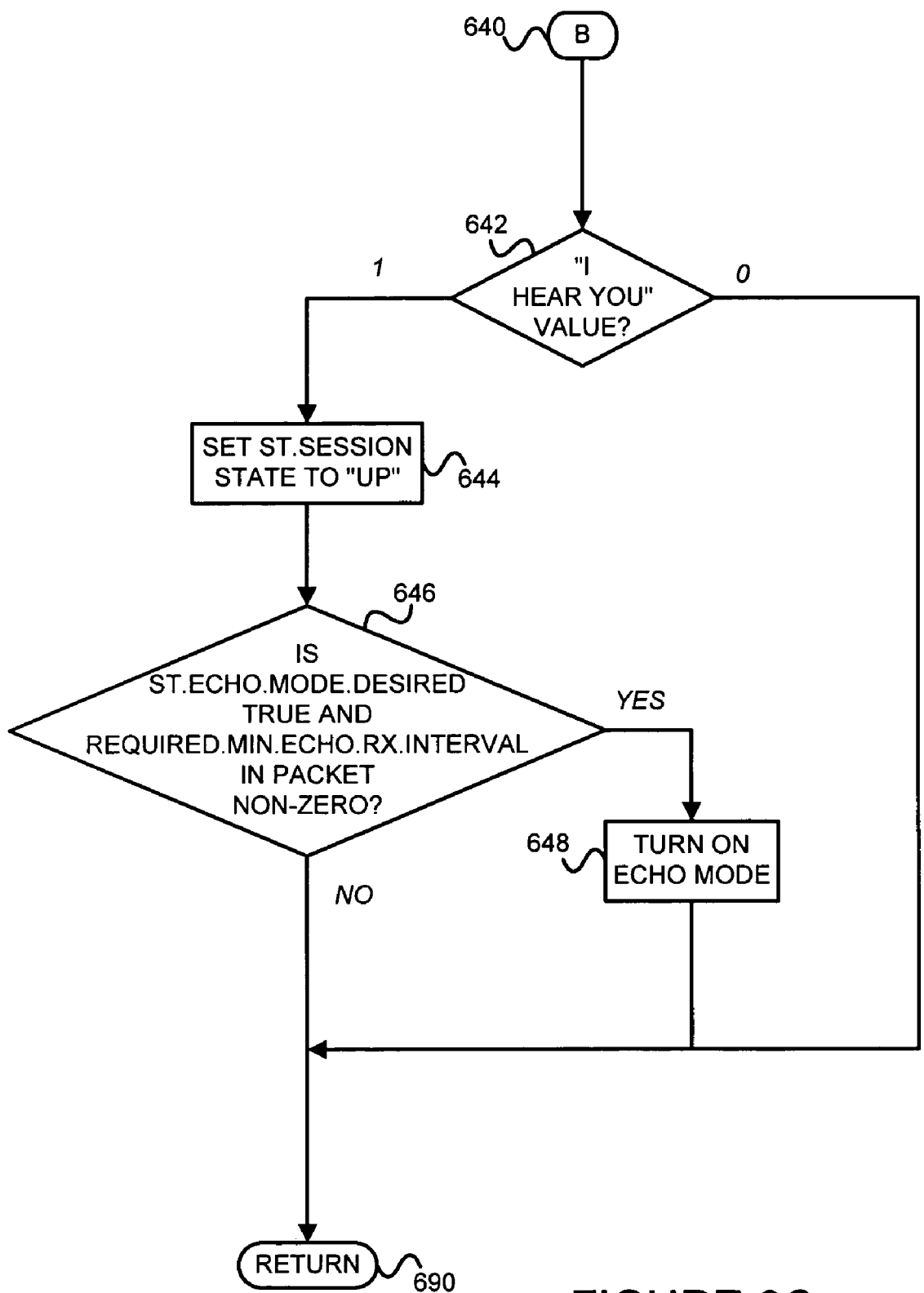
Figure 6D:
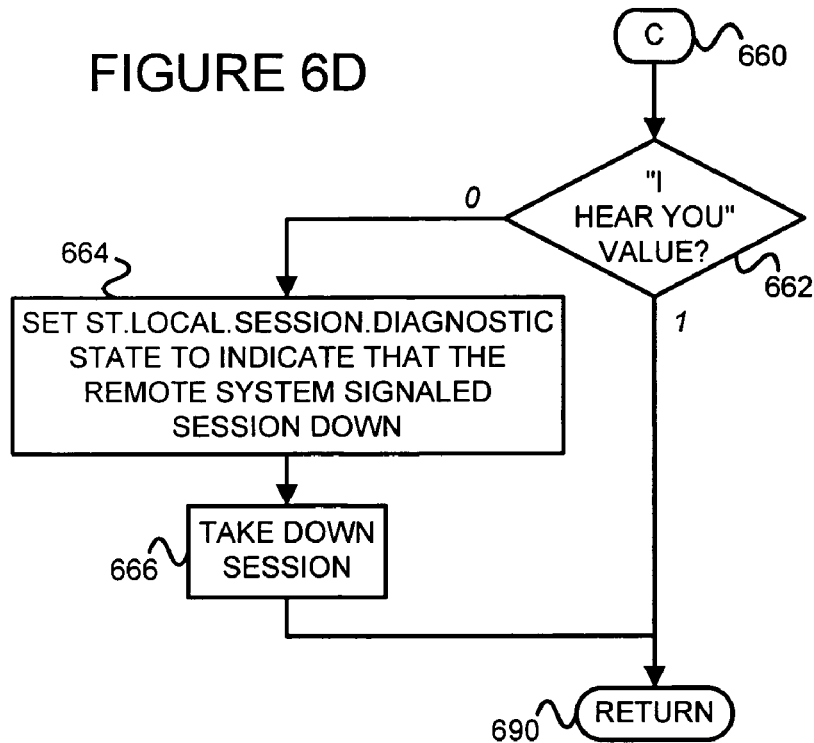
Figure 6E:
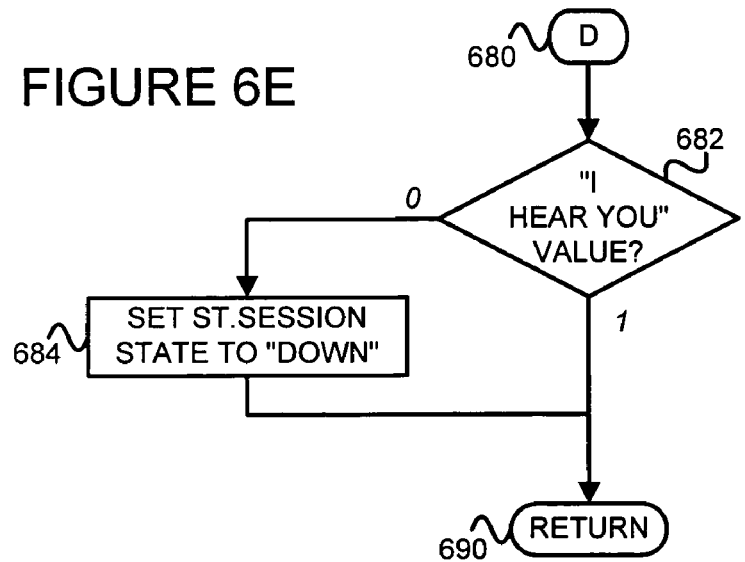

Various branches of the method may be performed depending on the state of the BFD session. (Block 619) FIG. 6B illustrates exemplary acts that may be performed if the session state is "down". (Node A 620) FIG. 6C illustrates exemplary acts that may be performed if the session state is "init". (Node B 640) FIG. 6D illustrates exemplary acts that may be performed if the session state is "up". (Node C 660) Finally, FIG. 6E illustrates exemplary acts that may be performed if the session state is "failing". (Node D 680)

FIG. 6B illustrates exemplary acts that may be performed if the session state is "down". (Node A 620) The system updates its local state information to indicated that it is receiving BFD packets from the other (i.e., remote) system. This may be done by setting the value of st.remote.heard to "1." (Block 622) If the remote system is not receiving BFD packets or if the remote system is in the process of tearing down the BFD session (e.g., if the value of the H bit 510 in the received BFD control packet is "0"), the value of st.session is set to "init" (Blocks 624 and 632) before the method is left (Node 690). Otherwise, the value of st.session is set to "up" (Blocks 624 and 626) and the method continues. More specifically, it is determined whether or not both of the systems want to use the echo mode. This may be done by determining whether both the value of st.echo.mode.desired is "true" and the value of the Required Min Echo RX Interval field 550 in the received BFD control packet is non-zero. (Block 628) If both systems want to use the echo mode, the echo mode is turned on (Block 630) before the method is left (Node 690). Otherwise, if either system does not want to use the echo mode, the method is simply left (Node 690). An exemplary method for tuning on the echo mode is described later with reference to FIG. 8. The various acts of FIG. 6B may be performed using the following instructions:

If st.SessionState is Down
    Set st.RemoteHeard to 1
    If I Hear You is zero
      Set st.SessionState to Init
    Else
      Set st.SessionState to Up
      If st.EchoModeDesired is TRUE and Required
      Min
      Echo RX Interval is nonzero
        Execute TurnOnEchoMode FIG. 6C illustrates exemplary acts that may be performed if the session state is "init". (Node B 640) If the remote system is not receiving BFD packets or if the remote system is in the process of tearing down the BFD session (e.g., if the value of the H bit 510 in the received BFD control packet is 0), the method is left. (Block 642 and Node 690) Otherwise, the value of st.session is set to "UP" (Blocks 642 and 644) and the method continues. More specifically, it is determined whether or not both of the systems want to use the echo mode. This may be done by determining whether both the value of st.echo.mode.desired is "true" and the value of the Required Min Echo RX Interval field 550 in the received BFD control packet is non-zero. (Block 646) If both systems want to use the echo mode, the echo mode is turned on (Block 648) before the method is left (Node 690). Otherwise, if either system does not want to use the echo mode, the method is simply left (Node 690). An exemplary method for tuning on the echo mode is described later with reference to FIG. 8. The various acts of FIG. 6C may be performed using the following instructions:

Else if st.SessionState is Init
        If I Hear You is nonzero
            Set st.SessionState to Up
            If st.EchoModeDesired is TRUE and Required
            Min Echo RX Interval is nonzero
                Execute TurnOnEchoMode FIG. 6D illustrates exemplary acts that may be performed if the session state is "UP". (Node C 660) If the remote system is not receiving BFD packets or if the remote system is in the process of tearing down the BFD session (e.g., if the value of the H bit 510 in the received BFD control packet is "0") (Block 662), local state information (e.g., the value of st.local.session.diagnostic) is set to indicate that the remote system signaled that the BFD session is "DOWN" (Block 664) and the BFD session is taken down (Block 666) before the method is left (Node 690). Otherwise, the method is simply left. (Node 690) An exemplary method for taking a session down is described later with reference to FIG. 9. The various acts of FIG. 6D may be performed using the following instructions:

Else if st.SessionState is Up
        If I Hear You is zero
            Set st.LocalSessionDiagnostic to 3 (Neighbor
            signaled session down)
            Execute TakeDownSession Finally, FIG. 6E illustrates exemplary acts that may be performed if the session state is "failing". (Node D 680) If the remote system is not receiving BFD packets or if the remote system is in the process of tearing down the BFD session (e.g., if the value of the H bit 510 in the received BFD control packet is "0"), the value of st.session is set to "DOWN" (Blocks 682 and 684) before the method is left (Node 690). Otherwise, the method is simply left (Node 690). The various acts of FIG. 6E may be performed using the following instructions:

Else if st.SessionState is Failing
        If I Hear You is zero, set st.SessionState to Down FIG. 7 is an exemplary method that may be used to turn off the echo mode in a manner consistent with principles of the invention. Various local state information may be updated to reflect the fact that the BFD session will not use the echo mode. For example, the value of st.echo.mode.active is set to "FALSE" (Block 710), the mode of st.echo.detect.timer is set to "disarmed" (Block 720), and/or the mode of the st.echo.transmission.timer is set to "disarmed" (Block 730). This will let the other system know that the system will not support the echo mode and will avoid timers related to transmitting and detecting BFD echo packets running and generating unnecessary notifications. The method also determines whether or not the session state (st.session) is "UP." (Block 740) If not, the local system will transmit BFD control packets at a slower interval. (Recall, e.g., 360 and 340 of FIG. 3.) For example, the value of st.desired.min.tx.interval may be set to st.desired.min.slow.tx.interval. (Block 760) If, on the other hand, the session state is "UP", the BFD control packets are transmitted at the negotiated asynchronous mode rate. (Recall, e.g., 355 of FIG. 3.) For example, the value of st.desired.min.tx.interval may be set to st.desired.min.async.tx.interval (Block 750) The various acts of FIG. 7 may be performed using, for example, the following instructions:

TurnOffEchoMode:
    Set st.EchoModeActive to FALSE
    Disarm st.EchoDetectTimer
    Disarm st.EchoTransmissionTimer
    If st.SessionState is Up
        Set st.DesiredMinTxInterval to
        st.DesiredMinAsyncTXInterval
    Else
        Set st.DesiredMinTxinterval to
        st.DesiredMinSlowTxInterval FIG. 8 is an exemplary method that may be used to turn on the echo mode in a manner consistent with principles of the invention. Basically, various local state information may be updated to reflect the fact that the BFD session will use the echo mode. For example, the value of st.echo.mode.active is set to "TRUE" (Block 810), the desire minimum transmission interval is set so that BFD control packets are set at the slower rate, and/or the echo detection and transmission timers are started using appropriate intervals. For example, the value of st.desired.min.tx.interval may be set to st.desired.min.slow.tx.interval) (Block 820). The mode of st.echo.detect.timer may be set to "active," and provided with an interval of st.echo.detection.time. (Block 830) Finally, the mode of the st.echo.transmission.timer may be set to "active," and provided with an interval of st.echo.tx.interval (Block 840). The various acts of FIG. 8 may be performed using, for example, the following instructions:

TurnOnEchoMode:
    Set st.EchoModeActive to TRUE
    Set st.DesiredMinTxInterval to
    st.DesiredMinSlowTxinterval
    Start st.EchoDetectTimer with an interval of
    st.EchoDetection Time.
    Start st.EchoTransmissionTimer with an interval of
    st.EchoTxInterval The value of the echo detect timer (st.EchoDetect.Timer) should initially be an interval greater than the link round trip time to avoid inevitable timer expiration and any associated errors. If necessary, st.EchoDetectTimer may be started with a value greater than st.EchoDetectionTime. The value of st.EchoTransmissionTimer may be provided with an interval of st.EchoTxInterval. Various techniques may be used for detecting lost echo packets, some of which are described in § 4.2.3.1. A system may decide not to negotiate echo mode when the latency is high relative to the detection time. Alternatively, it may set st.EchoDetectTimer to a sufficiently large interval when it is first started, or it may choose to use a different mechanism altogether (perhaps one that doesn't use timers at all) to determine whether echo packets have not arrived.

FIG. 9 is an exemplary method that may be used to take down a BFD session in a manner consistent with principles of the invention. The mode of the st.detect.timer may be set to "disarmed." (Block 910) The state information element st.session may be set to "FAILING" (Block 920), and the state information element st.remote.heard may be set to "0" (Block 930). Finally, the echo mode is turned off (Block 940) (Recall, e.g., the method of FIG. 7.) before the method is left (Node 950). The various acts of FIG. 9 may be performing, for example, using the following instructions:

TakeDownSession:
    Disarm st.DetectTimer
    Set st.SessionState to Failing
    Set st.RemoteHeard to zero
    Execute TurnOffEchoMode § 4.2.3.2 Exemplary Methods for Processing Responsive to Transmission Timer Expiration Recall from Block 440 of FIG. 4 above that when a timer expires, timer specific operations may be invoked. When the transmission timer expires (e.g., when st.TransmissionTimer expires), a BFD control packet is sent (after appropriate encapsulation, if any), and the timer is restarted (e.g., with an interval of st.TxInterval).

The packet encapsulating the BFP control packet may be sent with a source address of st.SourceAddress and a destination address of st.DestinationAddress. The fields of the exemplary BFP control packet 500 may be set as follows. The value of the "Version" field 505 may be set to the current version number. The "H" (I Hear You) bit 510 may be set to the value of local state information element st.RemoteHeard. The value of the "Diagnostic" field 515 may be set to the value of the local state information element st.LocalSessionDiagnostic. The value of the "Detect Mult" field 520 may be set to the value of the local state information element st.DetectMult. The value of the "My Discr" field 530 may be set to the local state information element st.LocalDiscr. The value of the "Your Discr" field 535 may be set to the local state information element st.RemoteDiscr if the value of st.SessionState is "INIT" or "UP", and otherwise may be set to zero. The value of the "Desired Min TX Interval" field 540 may be set to the local state information element st.DesiredMinTXInterval. The value of the "Required Min RX Interval" field 545 may be set to the local state information element st.RequiredMinRXInterval. Finally, the value of the "Required Min Echo RX Interval" field 550 may be set to the local state information element st.RequiredMinEchoRXInterval.

§ 4.2.3.3 Exemplary Methods for Processing Received BFD Echo Packets

Received BFD echo packets may be processed in a number of ways that will be apparent to those skilled in the art and that may depend on the application using BFD. Recall that, generally, only the system that sourced the BFD echo packet will use it—the non-sourcing system simply sends it back to the sourcing system. In one embodiment, when a BFD echo packet is received, the following procedure may be followed, for example.

The appropriate BFD session and associated state information (e.g., state block) is selected based on some combination of source addressing information, data placed in the payload of the echo packet, and the interface over which the packet was received. If a matching session is not found, the packet may be discarded. If the local state information element st.EchoModeActive is "FALSE", the system may discard the packet. The local system's st.EchoDetectTimer is restarted (e.g., with an interval of st.EchoDetection Time).

§ 4.2.3.4 Exemplary Methods for Processing Responsive to Echo Transmission Timer Expiration Recall from Block 440 of FIG. 4 above that when a timer expires, timer specific operations may be invoked. As one example, when st.EchoTransmissionTimer expires, a BFD echo packet is sent, and the timer is restarted with an interval of st.EchoTxInterval. The packet is sent with a source address of st.EchoSourceAddress and a destination address of st.EchoDestinationAddress. The contents of the packet will depend on the application using the BFD echo mode service.

§ 4.2.3.5 Exemplary Methods for Processing Responsive to Detection Timer Expiration Recall from Block 440 of FIG. 4 above that when a timer expires, timer specific operations may be invoked. As one example, if the st.DetectTimer expires, local state information elements may be appropriately set and the BFD session may be terminated. For example, st.LocalSessionDiagnostic may be set to 1 (which indicates that control detection time expired) and st.RemoteDiscr may be set to zero. The BFD session may be terminated using the exemplary method for taking down a session, as described in § 4.2.3.1 with reference to FIG. 9.

§ 4.2.3.6 Exemplary Methods for Processing Responsive to Echo Detection Timer Expiration Recall from Block 440 of FIG. 4 above that when a timer expires, timer specific operations may be invoked. As yet another example, if the st.EchoDetectTimer expires, local state information elements may be appropriately set and the BFD session may be terminated. For example st.LocalSessionDiagnostic may be set to 2 (which indicates that the echo detection time expired). The BFD session may be terminated using the exemplary method for taking down a session, as described in § 4.2.3.1 with reference to FIG. 9.

§ 4.2.3.7 Exemplary Methods for Managing BFD Sessions and State Parameters

§ 4.2.3.7.1 Modifying State Parameter Values

Recall from FIG. 2 that a BFD session component 200 may include session management operations 270. Such operations may be used to enter, determine, and/or modify various state information 250, change modes, etc. For example, if it is desired to change the rate at which BFD control packets arrive from the remote system, in one embodiment of the invention, st.RequiredMinRxInterval can be changed at any time to any value. The local system may transmit the new value at the next st.TransmissionTimer expiration, and the remote system should adjust its state accordingly.

If it is desired to change the rate at which BFD control packets are transmitted to the remote system (subject to the requirements of the remote system), in one embodiment of the invention, st.DesiredMinTxinterval can be changed at any time to any value. The local system may transmit the new value at the next st.TransmissionTimer expiration.

Note that st.TransmissionTimer should not be altered—it will pick up the new interval value (if any) at its next expiration. This avoids an expiration of the remote system's detection timer when increasing the transmission interval. If the first BFD packet containing a new, larger value of the interval is dropped, there is a chance that the detect timer will expire on the remote system and take down the BFD session. One embodiment of the invention may continue to transmit BFD control packets at the old, shorter interval for up to st.DetectMult packets before using the new, longer interval.

If it is desired to change the rate at which BFD Echo packets arrive from the remote system, in one embodiment of the invention, st.RequiredMinEchoRxInterval can be changed at any time to any value. The local system may transmit the new value at the next st.TransmissionTimer expiration. The remote system should then adjust its state accordingly.

If it is desired to change the detect multiplier, in one embodiment of the invention, the value of st.DetectMult can be changed to any nonzero value. The local system may transmit the new value at the next st.TransmissionTimer expiration.

§ 4.2.3.7.2 Resetting the Forwarding Component of the System

When the forwarding component (hardware) of a system is reset, the system's BFD session's st.LocalSessionDiagnostic may be set to 4 (to indicate a Forwarding plane reset), and the BFD session may be terminated. The BFD session may be terminated using the exemplary method for taking down a session, as described in § 4.2.3.1 with reference to FIG. 9.

§ 4.2.3.7.3 Changing BFD Mode

If it is desired to switch between the asynchronous mode and the echo mode, one embodiment of the invention permits such mode switching to be done at any time (assuming that both systems can support echo mode). More specifically, this may be done by changing the value of st.RequiredMinEchoRXInterval from zero to a nonzero value (to switch from asynchronous mode to echo mode), or from a nonzero value to zero (to switch from echo mode to asynchronous mode), accordingly. Recall from FIG. 3 that if the echo mode is enabled, echo packets will be sent and the rate of control packets will be reduced. The opposite will happen if echo mode is disabled.

§ 4.2.3.8 Exemplary Methods for Encapsulating BFD Packets

Recall from FIG. 2 that a BFD session component 200 may include encapsulation operations 230. Such encapsulation operations 230 may be used to insert a BFD packet as data into the payload of the packet of another protocol. The following describes particular examples of such encapsulation. Those skilled in the art will appreciate that a BFD packet may be inserted into the payload of other types of packets using other techniques. Exemplary techniques for encapsulating a BFD packet into IPv4, IPv6, and Ethernet packets are described below.

IPv4

In the case of IPv4, BFD control packets may be transmitted with a first predetermined source and destination UDP port (e.g., as granted by the Internet Assigned Numbers Authority (IANA)) in an IPv4 packet. The source and destination addresses are associated with the local and remote systems, respectively.

BFD echo packets may be transmitted with a second predetermined source and destination UDP port (e.g., as granted by IANA) in an IPv4 packet. Both the source and destination addresses are associated with the local system. In the case of BFD echo packets, the destination address should be to be chosen in such a way as to cause the remote system to forward the packet back to the local system.

IPv6

In the case of IPv6, BFD control packets may be transmitted with a first predetermined source and destination UDP port (e.g., as granted by IANA) in an IPv6 packet. The source and destination addresses are associated with the local and remote systems, respectively.

BFD echo packets may be transmitted with a second predetermined source and destination UDP port (e.g., as granted by IANA) in an IPv6 packet. Both the source and destination addresses are associated with the local system. In the case of BFD echo packets, the destination address should be chosen in such a way as to cause the remote system to forward the packet back to the local system.

IEEE 802

BFD can also be used directly on top of the datalink layer in IEEE 802 (e.g., Ethernet) networks. In this case, BFD control packets may be transmitted in an encapsulation appropriate for the particular IEEE 802 media, with a first predetermined Ether Type. Both the source and destination addresses are unicast MAC addresses associated with the local and remote systems, respectively.

BFD echo packets may be transmitted in an encapsulation appropriate for the particular IEEE 802 media, with a second predetermined Ether Type. Both the source and destination addresses are unicast MAC addresses associated with the local system. The destination address is chosen in such a way as to cause the remote system to forward the packet back to the local system. Note that BFD echo mode might not be appropriate for use directly over the data link layer because most data link devices cannot forward frames out over the interface over which they were received.

Security Considerations for Encapsulation

When BFD is run over network layer protocols, a significant denial-of-service risk is created, as BFD packets may be trivial to spoof. This potential security problem may be addressed by having packets carrying BFD payload expire soon since only a single link (hop) is being tested. More specifically, this may be done by carefully choosing and/or checking time to live (TTL) values in IPv4 and IPv6 packets.

For example, when the session is directly connected across a single link, the TTL may be set to the maximum value (or some other predetermined value) on transmit, and checked to be equal to the maximum value (or some other predetermined value) on reception (and the packet dropped if this is not the case.)

If BFD is run across multiple hops (for example, if the "link" being tested is an LSP), some alternative mechanism may be used. One option would be to ensure that the network addresses used for BFD are not routable outside of the infrastructure in which BFD is running (and assuming there are no users connected within that network.) Another option would be to filter all packets carrying BFD's UDP ports at the edges of the network. Still another option would be to use cryptographic methods, though this is not likely to allow for very short detection times.

§ 4.2.4 Exemplary Apparatus

FIG. 11 is high-level block diagram of a machine 1100, consistent with the invention, which may perform one or more of the operations discussed above. Machine 1100 includes a processor 1110, an input/output interface unit 1130, a storage device 1120, and a system bus and/or a network 1140 for facilitating the communication of information among the coupled elements. An input device 1132 and an output device 1134 may be coupled with the input/output interface 1130. Operations of the invention may be effected by the processor 1110 executing instructions. The instructions may be stored in the storage device 1120 and/or received via the input/output interface 1130. The instructions may be functionally grouped into processing modules. Although not shown, more than one of some or all of these components may be provided.

Machine 1100 may be a router for example. In an exemplary router, the processor 1110 may include a microprocessor, a network processor, and/or (e.g., custom) integrated circuits. In the exemplary router, the storage device 1120 may include one or more ROM, RAM, SDRAM, SRAM, SSRAM, DRAM, flash drive, hard disk drive, and/or flash card. At least some of these storage device 1120 may include program instructions defining an operating system, a protocol module (e.g. daemon) and/or other modules. In one embodiment, the methods consistent with the invention may be performed by a microprocessor executing stored program instructions. At least a portion of the machine executable instructions may be stored (temporarily or more permanently) on the storage device 1120 and/or may be received from an external source via an input interface unit 1130. Finally, in the exemplary router, the input/output interface unit 1130, input device 1132 and output device 334 may include interfaces to terminate communications links.

Exemplary machine 1100 may include other elements in addition to, or in place of, the elements illustrated in FIG. 11 without departing from the principles of the invention. For example, there could be one or more additional processors, input devices, storage devices, etc.

Naturally, the operations of the invention may be performed on systems other than routers. Such other systems may employ different hardware and/or software.

The foregoing description of embodiments consistent with the principles of the invention provides illustration and description, but is not intended to be exhaustive or to limit the invention to the precise form disclosed. Modifications and variations are possible in light of the above teachings or may be acquired from practice of the invention. For example, although a series of acts may have been described with reference to a flow diagram, the order of acts may differ in other implementations when the performance of one act is not dependent on the completion of another act. Further, non-dependent acts may be performed in parallel.

No element, act or instruction used in the description should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for testing a data forwarding path between a first system and a second system, the method comprising:
    a) transmitting, from the first system to the second system, a first instance of session control information;
    b) receiving, by the first system from the second system, a second instance of session control information;
    c) determining, for the first system, a first interval at which to send instances of session information to the second system, using information included in the second instance of session control information;
    d) receiving, by the first system from the second system, a new instance of session control information; and
    e) changing the first interval at which to send instances of session information to the second system using information included in the new instance of session control information.

2. The method of claim 1 wherein the first instance of session control information includes at least a minimum interval, proposed by the first system, to use when transmitting instances of session information.

3. The method of claim 1 wherein the second instance of session control information includes at least a minimum interval between instances of session information received from the first system that the second system indicates support for, and
    wherein the act of determining the first interval at which to send further instances of session information to the second system uses at least the minimum interval.

4. The method of claim 3 wherein the new instance of session control information includes at least a new minimum interval between instances of session information received from the first system that the second system indicates support for, and
    wherein the act of changing the first interval at which to send further instances of session information to the second system uses at least the new minimum interval.

5. The method of claim 1 wherein each of the first and second systems include a data forwarding component and one or more interfaces, and
    wherein the first and second systems are able to communicate with one another using one or more links.

6. The method of claim 1 further comprising:
    f) determining, for the first system, a second interval; and
    g) triggering error processing if a further instance of session information is not received by the first system from the second system for a period of time exceeding the second interval.

7. The method of claim 6 wherein the second interval is an integer multiple of the first interval.

8. The method of claim 6 wherein the error processing includes notifying a control facility of the first system that the data forwarding path between the first system and the second system is not operating properly.

9. The method of claim 6 wherein the error processing includes determining an alternative data forwarding path between the first system and the second system.

10. The method of claim 9 wherein the error processing includes using the determined alternative data forwarding path instead of the data forwarding path tested.

11. The method of claim 1 wherein the data forwarding path includes a link, an interface of the first system that terminates the link, and an interface of the second system that terminates the link.

12. The method of claim 11 wherein the data forwarding path further includes a data forwarding facility of the first system and a data forwarding facility of the second system.

13. The method of claim 1 wherein the act of determining the first interval further uses a state information element of the first system.

14. The method of claim 13 wherein the first interval is the maximum of (1) a value of the state information element of the first system, and (2) a value of the information, corresponding to the value of the state information element of the first system, included in the second instance of session control information.

15. The method of claim 1 wherein the first instance of session control information includes at least a minimum interval between instances of session information received from the second system that the first system indicates support for.

16. The method of claim 1 wherein the first instance of session control information includes at least (1) a minimum interval, proposed by the first system, to use when transmitting instances of session information, and (2) a minimum interval between instances of session information received from the second system that the first system indicates support for.

17. The method of claim 1 wherein the first instance of session control information transmitted is carried as data in an Internet protocol packet.

18. The method of claim 17 wherein the Internet protocol packet is set and handled to limit forwarding of the Internet protocol packet to a single hop.

19. The method of claim 1 wherein the first instance of session control information transmitted is carried as data in an Ethernet packet.

20. A method for testing a data forwarding path between a first system and a second system, the method comprising:
    a) establishing a session between the first system and the second system, under which session the first system sends session information to the second system at a first interval rate, the session information including a session state value selected from a group of session state values consisting of down, initializing, up and failing; and
    b) changing the first interval rate without bringing down the session,
    wherein when the session state value is down, when a transmitting system either (A) is not receiving session packets from a remote system, or (B) is in the process of tearing down the session, the session state value is changed to initializing, and is otherwise changed to up,
    wherein when the session state value is initializing, when the transmitting system either (A) is not receiving session packets from the remote system, or (B) is in the process of tearing down the session, the session state value is left unchanged and is otherwise changed to up,
    wherein when the session state value is up, when the transmitting system either (A) is not receiving session packets from the remote system, or (B) is in the process of tearing down the session, the session state value is changed to down and is otherwise unchanged, and wherein when the session state value is failing, when the transmitting system either (A) is not receiving session packets from the remote, or (B) is in the process of tearing down the session, the session state value is changed to down and is otherwise unchanged.

21. The method of claim 20 wherein the act of changing the first interval rate is initiated by the first system.

22. The method of claim 20 wherein the first system initiates the act of changing the first interval rate by determining a new desired minimum transmission interval rate.

23. The method of claim 20 wherein the act of changing the first interval rate is initiated by the second system.

24. The method of claim 20 wherein the second system initiates the act of changing the first interval rate by sending to the first system, a new required minimum reception interval rate.

25. The method of claim 20 wherein each of the first and second systems include a data forwarding component and one or more interfaces, and wherein the first and second systems are able to communicate with one another using one or more links.

26. The method of claim 20 wherein the data forwarding path includes a link, an interface of the first system that terminates the link, and an interface of the second system that terminates the link.

27. The method of claim 26 wherein the data forwarding path further includes a data forwarding facility of the first system and a data forwarding facility of the second system.

28. Apparatus for testing a data forwarding path between a first system and a second system, the apparatus comprising:

at least one processor;

at least one input/output interface unit; and at least one storage device, the storage device storing program instructions which, when executed by the at least one processor, perform a method including:

a) transmitting, from the first system to the second system, a first instance of session control information;

b) receiving, by the first system from the second system, a second instance of session control information;

c) determining, for the first system, a first interval at which to send instances of session information to the second system, using information included in the second instance of session control information;

d) receiving, by the first system from the second system, a new instance of session control information; and e) changing the first interval at which to send instances of session information to the second system using information included in the new instance of session control information.

29. The apparatus of claim 28 wherein the first instance of session control information includes at least a minimum interval, proposed by that the first system, to use when transmitting instances of session information.

30. The apparatus of claim 28 wherein the second instance of session control information includes at least a minimum interval between instances of session information received from the first system that the second system indicates support for, and wherein the act of determining the first interval at which to send further instances of session information to the second system uses at least the minimum interval.

31. The apparatus of claim 30 wherein the new instance of session control information includes at least a new minimum interval between instances of session information received from the first system that the second system indicates support for, and wherein the act of changing the first interval at which to send further instances of session information to the second system uses at least the new minimum interval.

32. The apparatus of claim 28 wherein each of the first and second systems include a data forwarding component and one or more interfaces, and wherein the first and second systems are able to communicate with one another using one or more links.

33. The apparatus of claim 28, wherein the program instructions, which, when executed by the at least one processor, perform the method further including:

f) determining, for the first system, a second interval; and g) triggering error processing if a further instance of session information is not received by the first system from the second system for a period of time exceeding the second interval.

34. The apparatus of claim 33 wherein the second interval is an integer multiple of the first interval.

35. The apparatus of claim 33 wherein the error processing includes notifying a control facility of the first system that the data forwarding path between the first system and the second system is not operating properly.

36. The apparatus of claim 33 wherein the error processing includes determining an alternative data forwarding path between the first system and the second system.

37. The apparatus of claim 36 wherein the error processing includes using the determined alternative data forwarding path instead of the data forwarding path tested.

38. The apparatus of claim 28 wherein the data forwarding path includes a link, an interface of the first system that terminates the link, and an interface of the second system that terminates the link.

39. The apparatus of claim 38 wherein the data forwarding path further includes a data forwarding facility of the first system and a data forwarding facility of the second system.

40. The apparatus of claim 28 wherein the act of determining the first interval further uses a state information element of the first system.

41. The apparatus of claim 40 wherein the first interval is the maximum of (1) a value of the state information element of the first system, and (2) a value of the information, corresponding to the value of the state information element of the first system, included in the second instance of session control information.

42. The apparatus of claim 28 wherein the first instance of session control information includes at least a minimum interval between instances of session information received from the second system that the first system indicates support for.

43. The apparatus of claim 28 wherein the first instance of session control information includes at least (1) a minimum interval, proposed by the first system, to use when transmitting instances of session information, and (2) a minimum interval between instances of session information received from the second system that the first system indicates support for.

44. The apparatus of claim 28 wherein the first instance of session control information transmitted is carried as data in an Internet protocol packet.

45. The apparatus of claim 44 wherein the Internet protocol packet is set and handled to limit forwarding of the Internet protocol packet to a single hop.

46. The apparatus of claim 38 wherein the first instance of session control information transmitted is carried as data in an Ethernet packet.

47. Apparatus for testing a data forwarding path between a first system and a second system, the apparatus comprising:
at least one processor;
at least one input/output interface unit; and
at least one storage device, the storage device storing program instructions which, when executed by the at least one processor, perform a method including:
a) establishing a session between the first system and the second system, under which session the first system sends session information to the second system at a first interval rate, the session information including a session state value selected from a group of session state values consisting of down, initializing, up and failing; and
b) changing the first interval rate without bringing down the session,
wherein when the session state value is down, when a transmitting system either (A) is not receiving session packets from a remote system, or (B) is in the process of tearing down the session, the session state value is changed to initializing and is otherwise changed to up,
wherein when the session state value is initializing, when the transmitting system either (A) is not receiving session packets from the remote system, or (B) is in the process of tearing down the session, the session state value is left unchanged and is otherwise changed to up,
wherein when the session state value is up, when the transmitting system either (A) is not receiving session packets from the remote system, or (B) is in the process of tearing down the session, the session state value is changed to down and is otherwise unchanged, and
wherein when the session state value is failing, when the transmitting system either (A) is not receiving session packets from the remote system, or (B) is in the process of tearing down the session, the session state value is changed to down and is otherwise unchanged.

48. The apparatus of claim 47 wherein the act of changing the first interval rate is initiated by the first system.

49. The apparatus of claim 48 wherein the act of changing is initiated by determining a new desired minimum transmission interval rate.

50. The apparatus of claim 47 wherein the act of changing the first interval rate is initiated by the second system.

51. The apparatus of claim 50 wherein the act of changing is initiated by sending to the first system, a new required minimum reception interval rate.

52. The apparatus of claim 47 wherein each of the first and second systems include a data forwarding component and one or more interfaces, and
wherein the first and second systems are able to communicate with one another using one or more links.

53. The apparatus of claim 47 wherein the data forwarding path includes a link, an interface of the first system that terminates the link, and an interface of the second system that terminates the link.

54. The apparatus of claim 53 wherein the data forwarding path further includes a data forwarding facility of the first system and a data forwarding facility of the second system.

* * * * *